US008094796B2

(12) United States Patent
Toyoshima et al.

(10) Patent No.: US 8,094,796 B2
(45) Date of Patent: *Jan. 10, 2012

(54) CUSTOMER RESPONDING SYSTEM, COMPUTER TERMINAL, CUSTOMER RESPONDING METHOD AND RECORDING MEDIUM

(75) Inventors: Shunichi Toyoshima, Ibaraki (JP); Masatoshi Kohra, Tokyo (JP); Hideo Ogawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1195 days.

This patent is subject to a terminal disclaimer.

(21) Appl. No.: 11/645,178

(22) Filed: Dec. 26, 2006

(65) Prior Publication Data

US 2007/0127681 A1 Jun. 7, 2007

Related U.S. Application Data

(63) Continuation of application No. 10/613,216, filed on Jul. 7, 2003, now Pat. No. 7,162,018.

(30) Foreign Application Priority Data

Jul. 8, 2002 (JP) .................................. 2002-198676

(51) Int. Cl.
 H04M 1/56 (2006.01)
 H04M 15/06 (2006.01)
 H04M 3/42 (2006.01)
 H04M 3/00 (2006.01)
(52) U.S. Cl. ......... 379/142.01; 379/210.01; 379/265.01; 379/265.05

(58) Field of Classification Search ............... 379/88.19, 379/88.2, 88.21, 93.23, 142.01, 142.04, 142.06, 379/142.11–142.18, 207.15, 210.01, 211.02, 379/214.01, 218.01, 245, 265.01–265.04, 379/165.13, 345
See application file for complete search history.

(56) References Cited

U.S. PATENT DOCUMENTS 4,805,207 A * 2/1989 McNutt et al. ............. 379/88.25
(Continued)

FOREIGN PATENT DOCUMENTS

JP 2000-332898 11/2000
(Continued)

OTHER PUBLICATIONS

Toyoshima et al., U.S. Office Action mailed Aug. 24, 2005, directed to U.S. Appl. No. 10/613,216; 7 pages.

(Continued)

Primary Examiner — Quoc D Tran
(74) Attorney, Agent, or Firm — Morrison & Foerster LLP

(57) ABSTRACT

When a call from external telephone network can not be forwarded to a telephone terminal used by a requested communicator, a client PC of the communicator who took the call, accepts an inputting of call back data, displaying the call back message, to communicate to the requested communicator by the concerned communicator. The concerned client PC sends the accepted call back data to the client PC used by the designated requested communicator. When the client PC of the sending destination receives the call back data, it notifies the concerned communicator that he/she has received a call back data. Furthermore, the client PC of the sending destination responds to an instruction by a communicator, and lists the received call back data in the inputted order.

12 Claims, 26 Drawing Sheets

U.S. PATENT DOCUMENTS

| | | | |
|---|---|---|---|
| 5,754,636 A | 5/1998 | Bayless et al. | |
| 5,943,417 A * | 8/1999 | Cox et al. | 379/266.02 |
| 6,263,061 B1 | 7/2001 | Tanaka et al. | |
| 6,324,263 B1 | 11/2001 | Sherwood et al. | |
| 6,704,403 B2 | 3/2004 | Lurie et al. | |
| 6,798,872 B1 | 9/2004 | Matsumoto et al. | |
| 7,035,388 B2 | 4/2006 | Kurosaki | |
| 7,162,018 B2 * | 1/2007 | Toyoshima et al. | 379/142.01 |

FOREIGN PATENT DOCUMENTS

| | | |
|---|---|---|
| KR | 1020020003631 A | 1/2002 |

OTHER PUBLICATIONS

Toyoshima et al., U.S. Office Action mailed Feb. 8, 2006, directed to U.S. Appl. No. 10/613,216; 8 pages.

* cited by examiner

FIG. 3

| GROUP ID | COMMUNICATOR ID | TELEPHONE TERMINAL IDENTIFICATION ID | BUSINESS SITUATION INFORMATION |
|---|---|---|---|
| CLERICAL EMPLOYEE 1 | TSUTSUMI | 123 | ON THE PHONE |
| CLERICAL EMPLOYEE 2 | HYO NOJIMA | 234 345 | NOT AT HIS/HER SEAT |
| . . . . . . . . . . | | | |

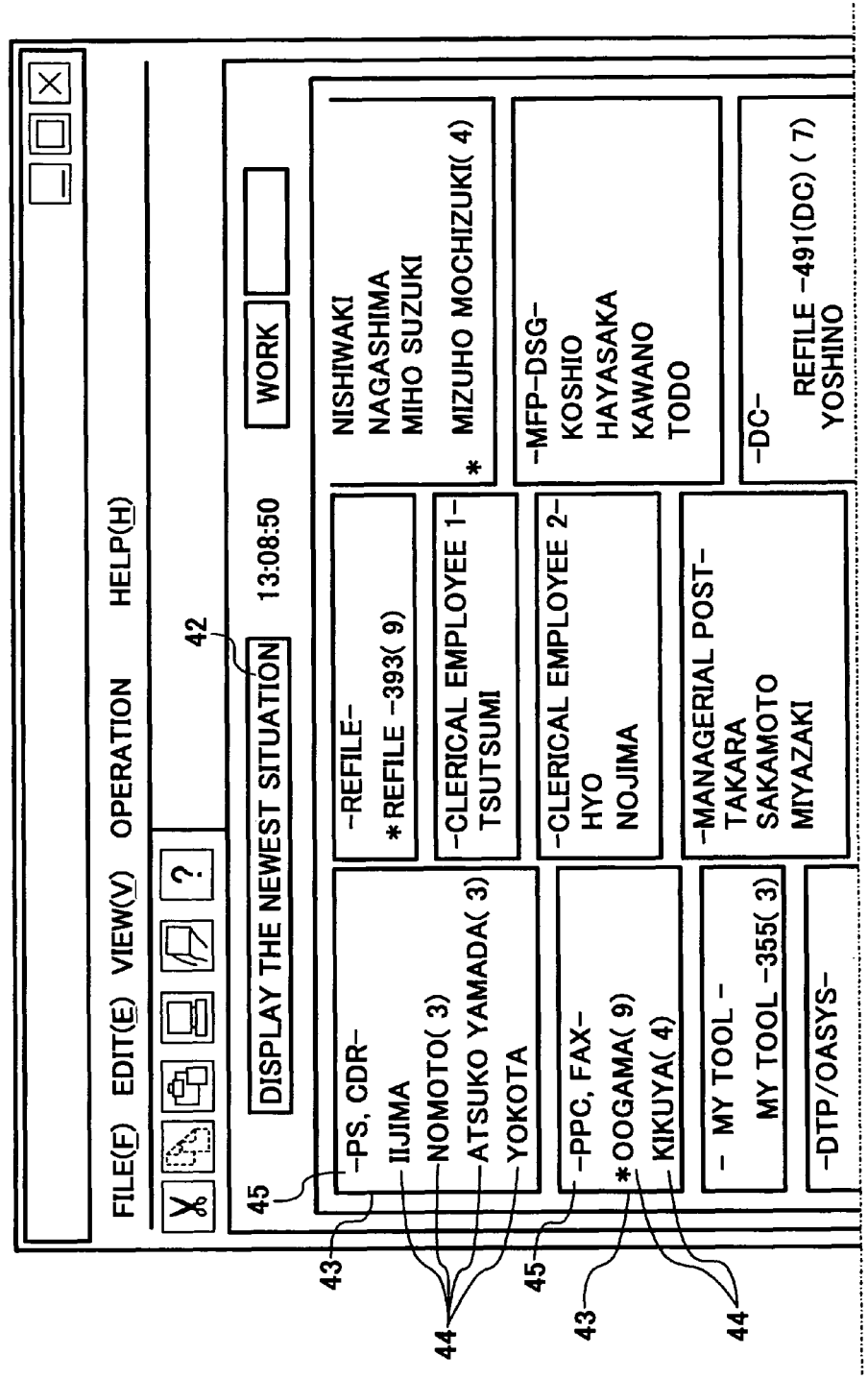

MY COMPUTER

NETWORK COMPUTER

CALL PATH CLIENT
FILE(F)   EDIT(E)   VIEW(V)

RESPONDENCE RECORD SHEET

RESPONDENCE SHEET | INPUT SYSTEM

RECIPIENT [998]NISHIHORI ▼      DATE
ROUTE [           ▼]-[388] AREA CODE [   ]

CUSTOMER COMPANY [           ][?]
  NAME [           ] TEL [      ]
  ADDRESS 〒[  ]-[  ][?][      ]

MODEL [      ][?] [01] MAIN BODY CLASSIFICATION
[      ]

REQUEST INTRODUCTION DESTINATION
  NAME [           ] TEL [      ]

PERSON WHO RESPONDED [998]NISHIHORI ▼   CALLER
CONTENT OF A REPORT [         ▼]
DIVISION OF CONTENT [01]INQUIRY ▼
RESPONDENCE CONTENT [01]EXPLANATION ▼
RESPONDENCE RESULT [         ▼]
CAUSE [      ▼][      ▼][   ]
ESTIMATED CAUSE [           ]
PROCESSING TIME   RECIPIENT [  ] MIN.
DATE OF REPLY [2002/03/12]

READY

START                    CALLPATH CLIENT

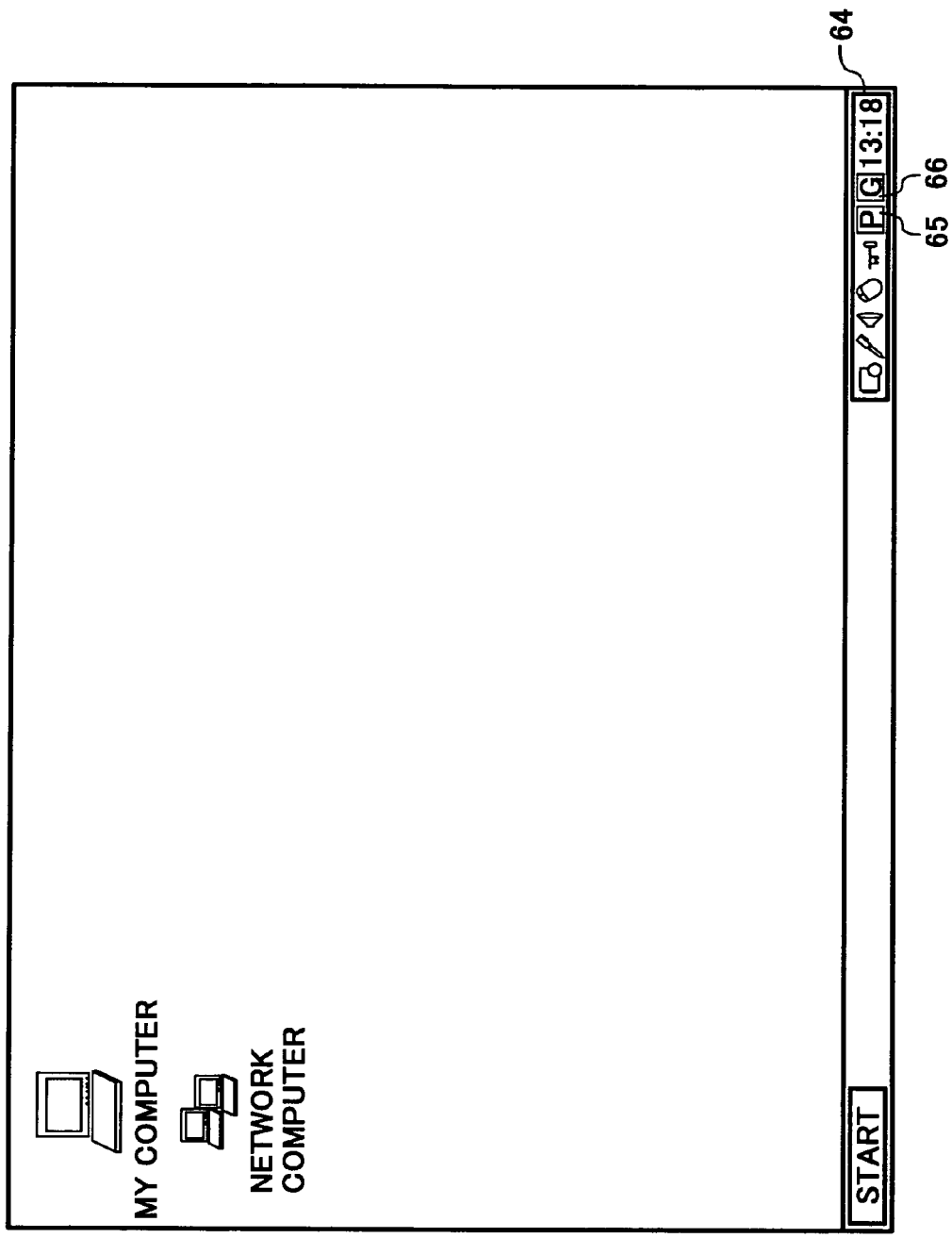

CUSTOMER RESPONDING SYSTEM, COMPUTER TERMINAL, CUSTOMER RESPONDING METHOD AND RECORDING MEDIUM

REFERENCE TO RELATED APPLICATION

This application is a continuation of application Ser. No. 10/613,216 filed Jul. 7, 2003, now U.S. Pat. No. 7,162,018 issued Jan. 9, 2007, the disclosure of which is hereby incorporated by reference.

BACKGROUND OF THE INVENTION

1. Field of the Invention

The present invention relates to a customer responding system, a computer terminal suitable for the customer responding system, a customer responding method, and a recording medium.

2. Description of the Related Art

A customer responding system which uses CTI (Computer Telephony Integration) technique integrating PBX (Private Branch eXchange) and computer network, has been disclosed in the Unexamined Japanese Patent Application KOKAI Publication No. 2000-332898.

When there are inquires from the same customer repeatedly, the above customer responding system, in principle, makes the phone of a communicator who responded to that first inquiry ring. Because this communicator can review the customer responding history information, a fast and efficient response can be possible, which leads to the improvement of customer service.

When a certain communicator can not get the phone because the certain communicator is not at his/her seat, the customer responding system makes another communicator's phone ring, based on a predetermined priority. But, there may be a case where all the communicators who are chosen according to the predetermined priority, can not get the phone from the aforementioned customer.

In this case, a communicator who is able to respond, takes the call from the customer. After responding, the communicator writes down what the call was about on a respondence record sheet and puts it into a predetermined box to notify the communicator who was originally assigned to take that call. The concerned communicator checks to see if there is a respondence record sheet in this box, and if there is a sheet, the communicator calls back to the customer based on the contents written on the sheet.

However, the method using the aforementioned respondence record sheet has the following problems.

In case that the concerned communicator does not notice a respondence record sheet in the box, the call back to the customer would be late. Also, missing the respondence record sheet in the box, results in a case that the concerned communicator can not call back the customer. Furthermore, the communicator who took the call instead of the concerned communicator may forget to write a respondence record sheet, or to put the written sheet into the box. In this case also, the same problem as mentioned above occurs.

The respondence record sheets are piled up in the box in the order of which the sheets were written. The bottom sheet in the pile is for a customer who is supposed to have the call back first, and the top sheet is for a customer who is supposed to have the call back last. As the number of respondence record sheets in the box increase, the record sheets could get mixed up when the communicator searches for a certain sheet and takes it out from the box, thus leading to the communicator mistaking the priority of which customer to call back first.

SUMMARY OF THE INVENTION

The object of the present invention is to provide a customer responding system, a computer terminal, a customer responding method and a recording medium that can convey call back data to the requested communicator rapidly.

To achieve the object, the customer responding system according to a first aspect of the present invention includes a PBX (Private Branch eXchange) connected to an external telephone network, which selectively connects a calling signal from the external telephone network to one internal line in an internal telephone network, plural telephone terminals connected to the internal telephone network, and plural computer terminals connected to each other through a predetermined network, which is placed, individually corresponding to the telephone terminal. This customer responding system comprises:

call back message inputting means for accepting the inputting of a call back message with designating the computer terminal corresponding to the requested telephone terminal, when the PBX can not get the requested telephone terminal amongst the plural telephone terminals, to receive a calling signal from the external telephone network;

call back data sending means for sending a call back data, displaying the content of the call back message accepted by the call back message inputting means, to the designated computer terminal through the aforementioned network;

call back data receiving means for receiving the call back data sent by the call back data receiving means; and call back data displaying means for displaying the received call back data to the designated computer terminal.

In the aforementioned structure, user specifying means for specifying a user who sent out a calling signal from the external telephone network, respondence history storing means for storing the respondence content of an user's inquiry corresponding to the specified user, and respondence history data displaying means for reading out the aforementioned respondence history data representing the respondence content when a call back data is received according to the aforementioned call back data receiving means, and controlling the aforementioned designated computer terminal to display the aforementioned respondence history data, may be further comprised.

To achieve the aforementioned object, a computer terminal according to a second aspect of the present invention, is used as an information input/output device, in the customer responding system that includes a PBX connected to an external telephone network, which selectively connects a calling signal from the external telephone network to one internal line in an internal telephone network, plural telephone terminals connected to the internal telephone network, and plural information input/output devices connected to each other through a predetermined network, which is placed individually corresponding to the telephone terminal. When the PBX can not get the requested telephone terminal amongst the plural telephone terminals, to receive a calling signal from the external telephone network, the PBX controls a different telephone terminal to receive the calling signal. The computer terminal corresponding to the concerned different telephone terminal comprises:

call back message inputting means for accepting the inputting of a call back message, after designating the computer terminal corresponding to the requested telephone terminal;

call back data sending means for sending a call back data showing the content of the call back data, received by the call back message inputting means, to the designated computer terminal;

call back data receiving means for receiving the call back data sent from another computer terminal through the network; and call back data displaying means for displaying the call back data received by the call back data receiving means.

According to this structure, when the requested telephone terminal can not receive a call from the external telephone network, other communicators who responded to the call with a different telephone terminal, designate the requested communicator and input a call back message, and the inputted call back data showing the call back content, is sent to the computer terminal corresponding to the designated requested communicator. Meanwhile, the computer terminal corresponding to the requested communicator, displays the received call back data sent from other computer terminals. By this, a call back message is rapidly conveyed to the requested communicator, without complicated and troublesome movements, such as writing down respondence record sheets and putting the written sheets into a predetermined place.

The aforementioned computer terminal further comprises a business situation notifying means for notifying other computer terminals the business situation of a communicator corresponding to the aforementioned computer terminal, and the computer terminal may determine whether or not a call from the external telephone network is forwarded to the telephone terminal or not, according to the business situation of the communicator notified by other computer terminals.

According to this structure, because other communicators can know the business situation of each communicator, such as when each communicator is on the phone, or not at his/her seat, this information can be told to the customer without putting the phone on hold, and the communicator who is supposed to respond to the concerned customer can take measures such as calling back the customer. Also, because each communicator 19 can work, watching the situation of other communicator's situation on the screen real-time, he/she can stay mentally calm knowing the situation of the supporting staff, in times of unexpected calls (such as complaints).

A call back data reception notifying means for notifying a communicator that he/she has received a call back data according to the call back data receiving means may be further comprised, and the call back data displaying means, after the call back reception notifying means notifies that the communicator has received a call back data, may display the call back data in response to an instruction to display that call back data.

According to the aforementioned structure, the communicator is notified that he/she has received call back data, and reacting to the concerned communicator's instructions, the received call back data is displayed. By this, problems such as being late in returning a call, or not calling back, is avoided.

Plural computer terminals are arranged into predetermined groups, and the call back data sending means may send the call back data to each computer terminal included in the group of which the designated computer belongs to.

According to this structure, because another communicator, belonging to the same group as the requested communicator, can look at the call back data, a rapid respondence to the customer can be possible by a communicator belonging to the concerned group.

The aforementioned call back data displaying means, may list the contents of the received call back data.

According to this structure, because the received call back data is listed, the problem of a communicator forgetting to respond to a customer is avoided.

Each call back data may be listed in the order that it was inputted by the call back message inputting means.

According to this structure, the problem of a communicator mistaking the priority of which customer to call back first, occurring by the order of the displayed call back data changing places, can be prevented.

A respondence notifying means for notifying other computer terminals, according to the call back data received by the call back data receiving means, that the communicator corresponded to the concerned computer terminal is responding to a customer may be further comprised.

According to this structure, plural communicators duplicating to respond to the same customer is avoided, and an efficient respondence is possible.

To achieve the aforementioned object, a computer terminal according to a third aspect of the present invention comprises:

call back message inputting means for accepting an inputting of a call back message;

call back data sending means for sending a call back data, displaying the content of the call back message inputted by the call back message inputting means, to the requested computer terminal, through a predetermined network;

call back data receiving means for receiving the call back data sent from another computer terminal through the aforementioned network; and call back data displaying means for displaying the call back data received by the aforementioned call back data receiving means.

In the aforementioned structure, a call back data reception notifying means for notifying a communicator that he/she has received a call back data according to the call back data receiving means, and a call back data display instructing means for displaying the call back data by the call back data displaying means, based on an accepted instruction to display the requested call back data after a notification that a call back data has been received by the call back data reception notifying means may be further comprised.

To achieve the aforementioned object, a customer responding method according to a fourth aspect of the present invention, is a customer responding method which provides predetermined information to computer terminals, which are placed each corresponding to the telephone terminal, and connected respectively through a predetermined network, based on a received call from a PBX connected to an external telephone network which selectively connects a calling signal from this external telephone network to one internal line in an internal telephone network. The customer responding method comprises:

call back message inputting step which accepts the inputting of a call back message after a computer terminal corresponding to the requested terminal is designated, when the PBX can not receive the calling signal from the external telephone network to the requested telephone terminal;

call back data sending step which sends the call back data, displaying the content of the call back message accepted in the call back message inputting step, to the aforementioned designated computer terminal through the network;

call back data receiving step which receives the call back data sent by the data sending step; and call back data displaying step which controls the designated computer terminal to display the received call back data.

A business situation notifying step which notifies the business situation of a communicator, who is corresponded to each computer terminal, to other computer terminals, and a forwarding determination step, which determines whether a call from the external telephone network to the telephone terminal should be forwarded or not according to the notified business situation of a communicator corresponded to each computer terminal by the business situation notifying step, may be further comprised.

BRIEF DESCRIPTION OF THE DRAWINGS

These objects and other objects and advantages of the present invention will become more apparent upon reading of the following detailed description and the accompanying drawings in which:

FIG. 3 is a concept diagram showing an example of the communicator management table;

FIG. 12 is a plane view showing the indicator displayed in the client PC;

DETAILED DESCRIPTION OF THE PREFERRED EMBODIMENT

Figure 1A:
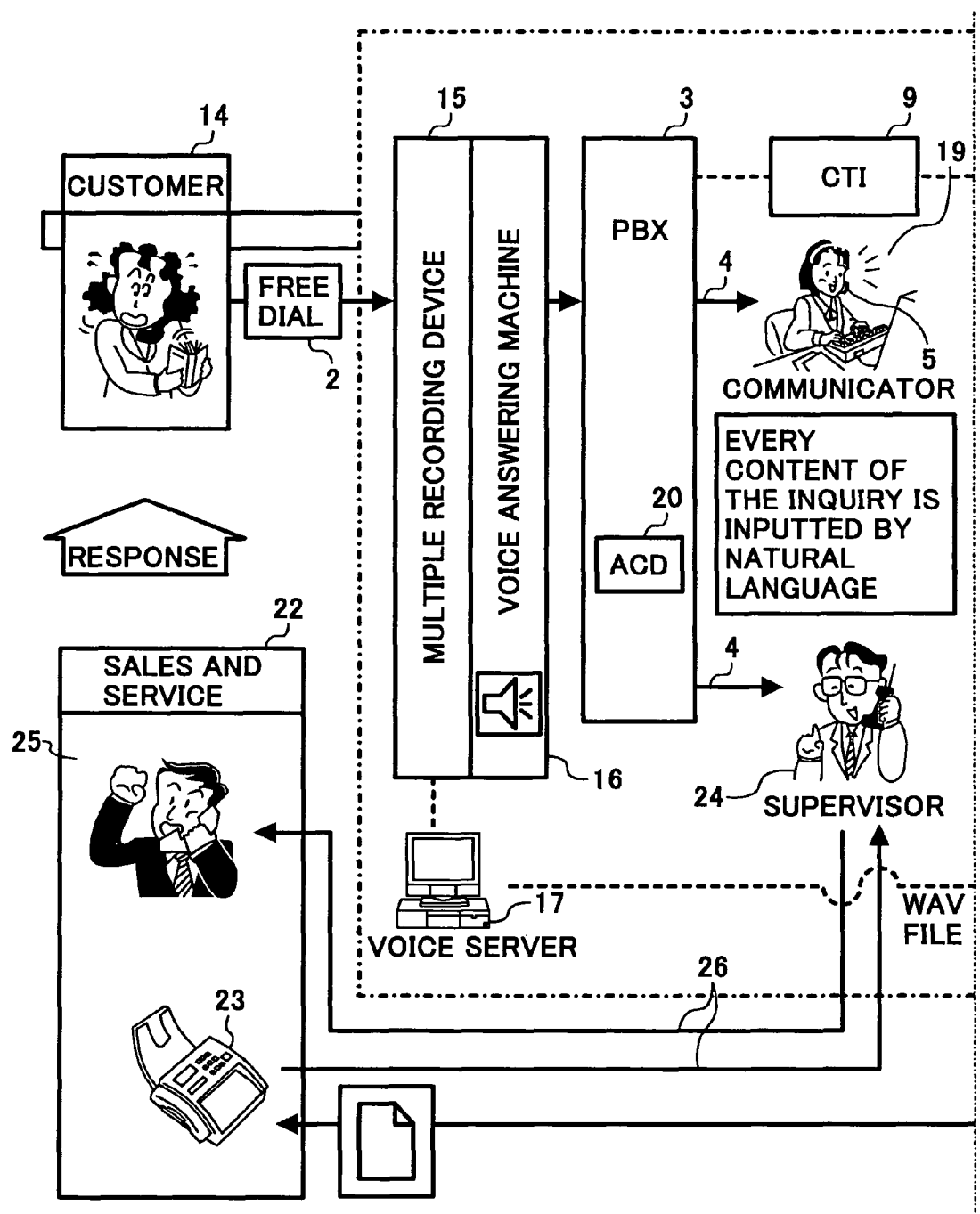
FIG. 1 is a diagram showing the system structure of the whole CTI (Computer Telephony Integration) system, which is an example concerning the customer responding system according to the embodiment of the present invention.
Figure 1B:
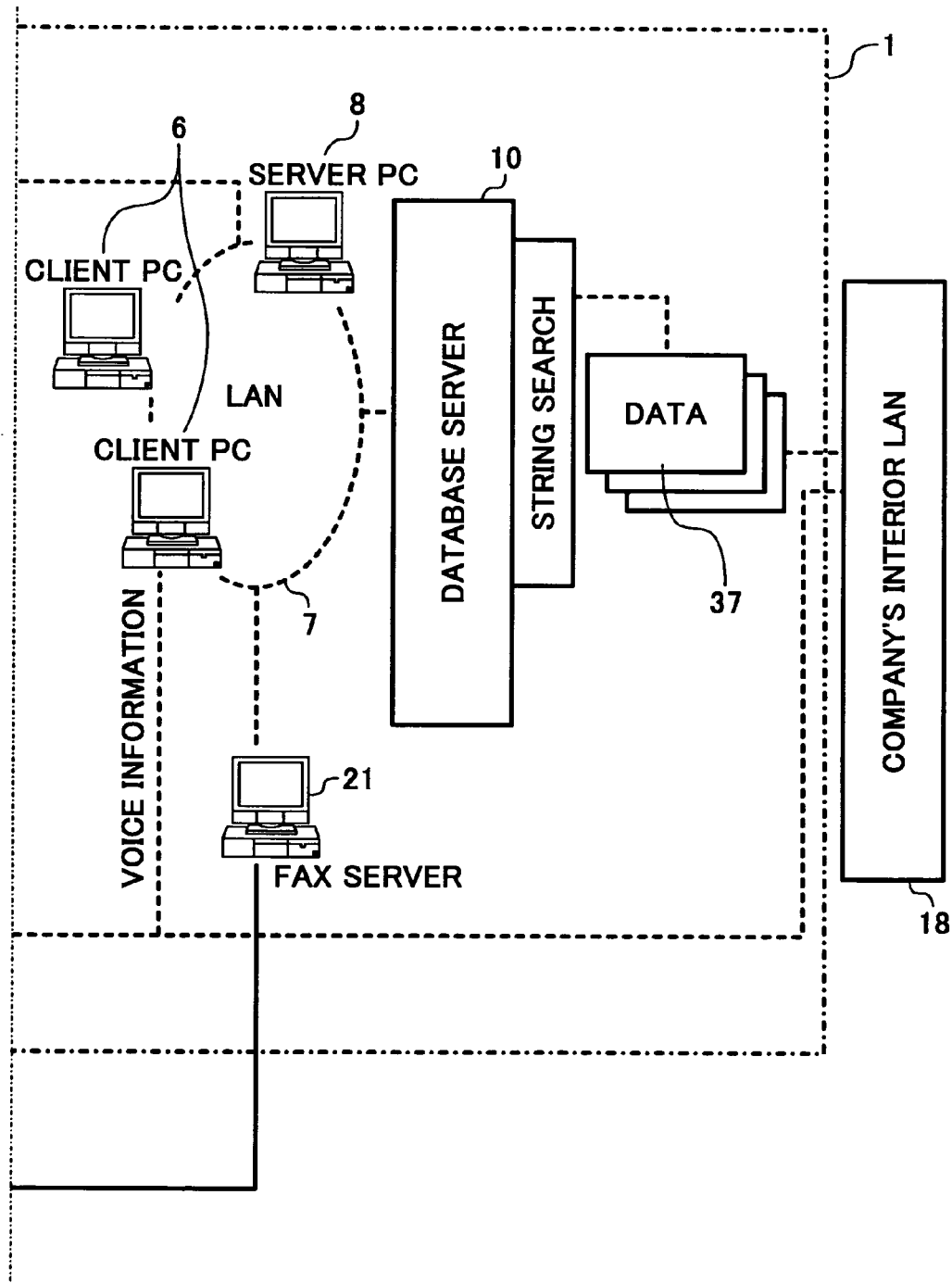

FIG. 1 shows the system structure of the whole CTI (Computer Telephony Integration) system, which is an example of the customer responding system according to the embodiment of the present invention. In FIG. 1, solid lines connecting each parts stand for the phone line, and dotted lines stand for the signal line.

The CTI system 1 in FIG. 1, is for example, placed in a customer complaint division of a private enterprise. The CTI system 1 comprises a PBX (Private Branch eXchange) 3 connected to an external telephone network 2, and plural phone terminals 5 connected to the PBX 3 through an internal telephone network 4, and a client PC (Personal Computer) 6 comprised in phone terminal 5 as an one-to-one corresponding information input/output device.

The client PC 6 is connected on a LAN (Local Area Network) constructed network 7. The network 7 is connected to and a server PC 8 which serves as a network server. The network 7 is connected to the PBX 3 through a CTI server 9. Furthermore, a database 10 is also connected to the network 7.

Though the control units will not be illustrated here, the client PC 6, the server PC 8, the CTI server 9, and the database server 10, which are prepared in a CTI system 1, each have control units comprise a CPU (Central Processing Unit), a RAM (Random Access Recording) and a ROM (Read Only Recording) as a work area. Also, the aforementioned computer units each have, internal storage such as hard disk, and/or external storage, such as magnetic disk and optical disk, for the writing of data to various recording medium, and/or for the reading of the aforementioned recording medium, if necessary.

The client PC 6, the server PC 8, the CTI server 9, and the database 10, run various processing based on a predetermined program. These programs are, for example stored in the aforementioned hard disk. The programs may be stored in the ROM of the control unit of the aforementioned computer unit. Or, for example, various programs are stored in a portable recording medium such as a CD-ROM, and the control unit of the computer unit reads the content of the recording, and carries out the predetermined processing. Either way, the programs for executing the various processing described later on, is used as being stored in the aforementioned recording medium. As it will be mentioned later on, the server PC 8 has a communicator management table, and the database server 10 has an originator ID index table (not shown) and a correspondence history master table (not shown), in each of their recording units.

As shown in FIG. 1, the external telephone network 2, a multiple recording device 15, and a voice answering device 16 are connected to the voice answering device 16. When a customer 14 calls the CTI system 1 through the external telephone network 2 with the toll-free number, before the calling signal is inputted to the PBX 3, the voice answering device 16 answers to the customer's call including the established guidance message. The multiple recording device 15 records a message from the customer, if necessary. A voice server 17 is connected to the multiple device 15. A voice message recorded in the multiple recording device 15, is converted by the voice server 17 into a WAV file (Wave format file), which can be used in general OS (Operating System), such as Windows. This makes it possible for the client PC 6 connected to the voice server 17 to read out a voice data in a WAV file format, thus the client PC 6 can reproduce a voice message from the WAV file. The voice data can be used anywhere in the company's interior LAN connected to the voice server 17.

Next, the operations of the PBX 3 which comprises an ACD (Auto Call Distributor) will be described.

Figure 2:
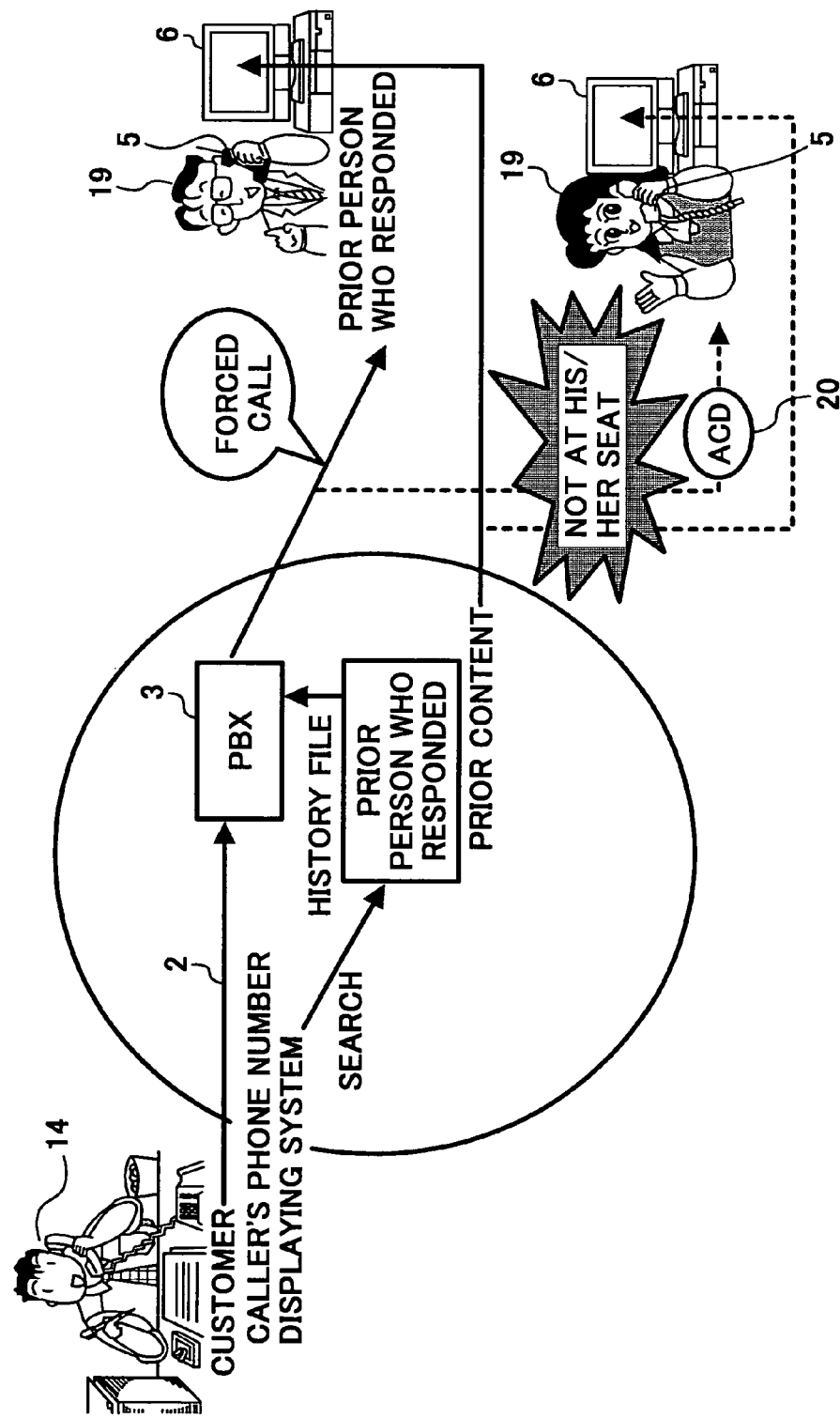
FIG. 2 is a diagram roughly explaining the basic processing in the CTI system of FIG. 1.

FIG. 2 is a diagram showing the basic processing of the CTI system 1. As mentioned before, the voice answering device 16, first answers the call from the customer 14. Then, a calling signal coming through the external telephone network 2, from the customer 14, is sent to the PBX 3. The PBX 3 receives the calling signal, and specifies the customer 14, for example by the phone number display system, in which the caller's phone number is accompanied by the calling signal, and through the CTI server 9, and searches for the communicator who responded to the phone call before, referring to a respondence history recorded in the respondence history master table (this will be described later on). The PBX 3 then sends the aforementioned calling signal to the phone terminal 5, which corresponds to a communicator 19 who was specified by the search.

In FIG. 2, communicator 19 who took previous calls is only shown as one person, but there are actually a plurality of communicators 19, and the number of communicators is predetermined by the number of communicators who have taken previous calls in the past. If every previous predetermined communicator who has responded to the call is not available because of talking to another customer etc., the PBX 3 operates the ACD 20 to send a calling signal to a telephone terminal of a communicator 19 who is available.

In the embodiment of the present invention, the CTI server 9 connected to the PBX 3 as shown in FIG. 1, displays the customer 14's customer respondence information on the client PC 6, which corresponds to the communicator 19, who is taking the call.

The processing shown in FIG. 2 will be described specifically.

First, the PBX 3 sends the caller's phone number included in the calling signal, through the external telephone network 2 to the CTI server 9. The CTI server 9 receives it, and further sends to the server PC 8. The server PC 8 receives the caller's phone number, and stores it in associating with the name of the communicator 19, who uses the telephone terminal 5, connected by the PBX 3, into the aforementioned caller ID index table which is in the database server 10. Furthermore, the server PC 8 records the content of how the communicator 19 responded to the call, which the customer respondence information was inputted by using client PC 6, into the aforementioned respondence history master table, in associating with the caller's phone number.

In this way, when there is a call from a customer 14, the server PC 8 updates the caller ID index table and the respondence history master table, and the database server 10 stores the updated caller ID index table and the respondence history master table.

When a calling signal from the customer 14 is inputted in the PBX 3, as mentioned before, the server PC 8 receives the caller's phone number from the PBX 3 through the CTI server 9. The server PC 8, based on this phone number, searches the caller ID index table, and extracts the name of the communicator 19 who corresponds to the caller's phone number. The server PC 8 refers to a communicator management table (this will be described later on), and extracts a communicator 19, and an identification number of the telephone terminal 5 corresponding to the communicator 19 is notified to the PBX 3 through the CTI server 9. The PBX 3 sends a calling signal to the corresponding telephone terminal 5 of the notified identification number, and enables the communicator 19 to talk.

Also, the server PC8, based on the received caller's phone number, searches the respondence history master table, and extracts the past record of the customer respondence information, corresponding to the caller's phone number. The Server PC 8 sends the extracted customer information to the client PC 6 of the corresponding communicator 19. By this, the communicator 19 can output the past customer respondence information, and respond to customer 14, while looking at the concerned customer's information.

Here, a communicator management table comprised in server PC8 will be described. As shown in FIG. 3, in the communicator management table 31, a communicator ID 33, distinguishing each communicator 19, and a telephone terminal identification ID 34, distinguishing the telephone terminal 5 used by the concerned communicator 19, and a business situation information 35, showing the business situation of communicator 19, are registered in corresponding to each other. When a communicator 19 is on the phone with a different customer, or not at his/her seat, that information is registered in the business situation information 35. Also, each communicator 19 is divided into groups, and in the communicator management table 31, as can be seen in FIG. 3, a group ID 32, which distinguishes each communicator 19's belonging department or section, is included. Concretely, the server PC 8 through the CTI server 9, determines from the situation of the PBX 3 and the ACD 20, whether the communicator 19 is on the phone, or not at his/her seat, and records the result of the determination as the business situation information 35.

Furthermore, as shown in FIG. 1, in the CTI system 1, a fax server 21 is connected to the network 7. This FAX server 21, for example, sends a customer 14's respondence history information recorded in the aforementioned respondence history master table to a facsimile machine 23, placed in a sales and service 22 section. Or, for example, between a supervisor 24 and a sales person or service attendant person 25, a respondence content of the customer 14 is transmitted by phone through an external line network 26. By this, the sales and service 22 section can quickly understand the content of the customer 14's inquiry, and can deal with the content rapidly and accurately.

The customer respondence information, recorded and stored in the respondence history master table of the data base server 10 is converted to a data 37, a file format which can be used in common computers with operating systems such as Windows, and OS/2. The converted data 37 is accessible through a company's interior LAN 18, and able to be used in the company's interior LAN 18.

Next, the structure and major function of the client PC 6 will be described.

The client PC 6 comprises a communication unit, an inputting unit, a control unit, a recording unit, and a display unit. The communication unit comprises a network interface (I/F) corresponding to the network 7, and communicates with the server PC 8 and other client PC 6. The inputting unit comprises pointing devices such as a mouse and key board. The control unit, as aforementioned, comprises a CPU, a RAM, a ROM, and etc., and controls each unit. The recording unit comprises the aforementioned internal storage, and/or an external storage. The display unit is a displaying device comprising units such as CRT (Cathode Ray Tube), and LCD (Liquid Crystalline Device).

Figure 4:
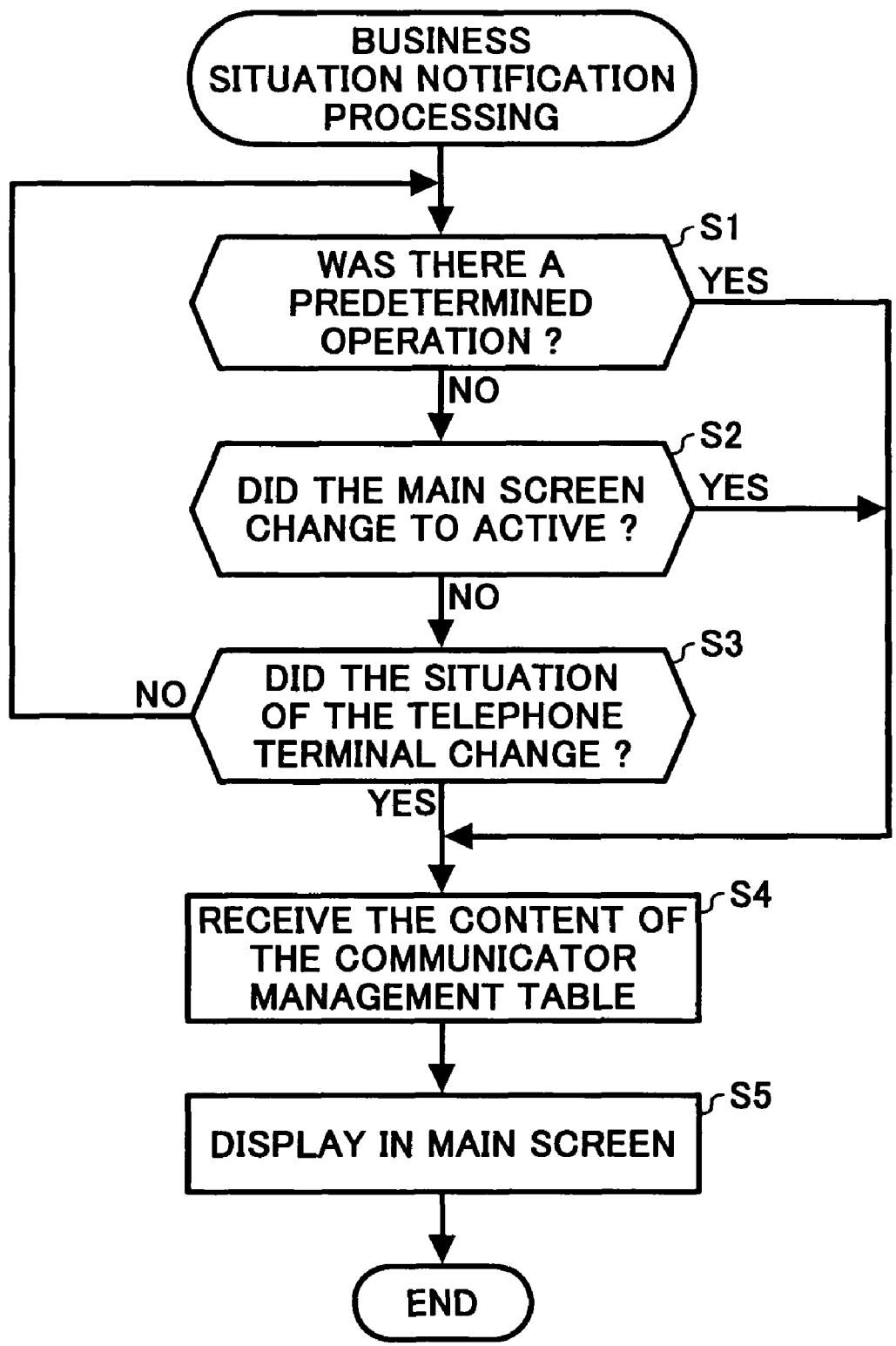
FIG. 4 is a flow chart showing the process of the client PC using the communicator management table of FIG. 3.

Each client PC 6 does the business situation informing process shown in FIG. 4. The client PC 6's control unit requests the server PC 8 to send the registered content of the aforementioned communicator management table 31, when it detects one of the following: a communicator 19's predetermined operation (STEP S1); a change of situation in the main screen (refer to FIG. 5) (STEP S2); or a change of situation in the telephone terminal 5 corresponding to the client PC 6 (STEP S3). The control unit, according to the aforementioned request, receives data from the communicator management table 31 sent from the server PC 8 (STEP S4). Then, the control unit, which has received data including each communicator's name displays their situation in different colors on the main screen 41 (refer to FIG. 5) in the display unit, in accordance with each communicator 19's situation (STEP S5). Here, a business situation informing process is embodied.

Figure 5B:
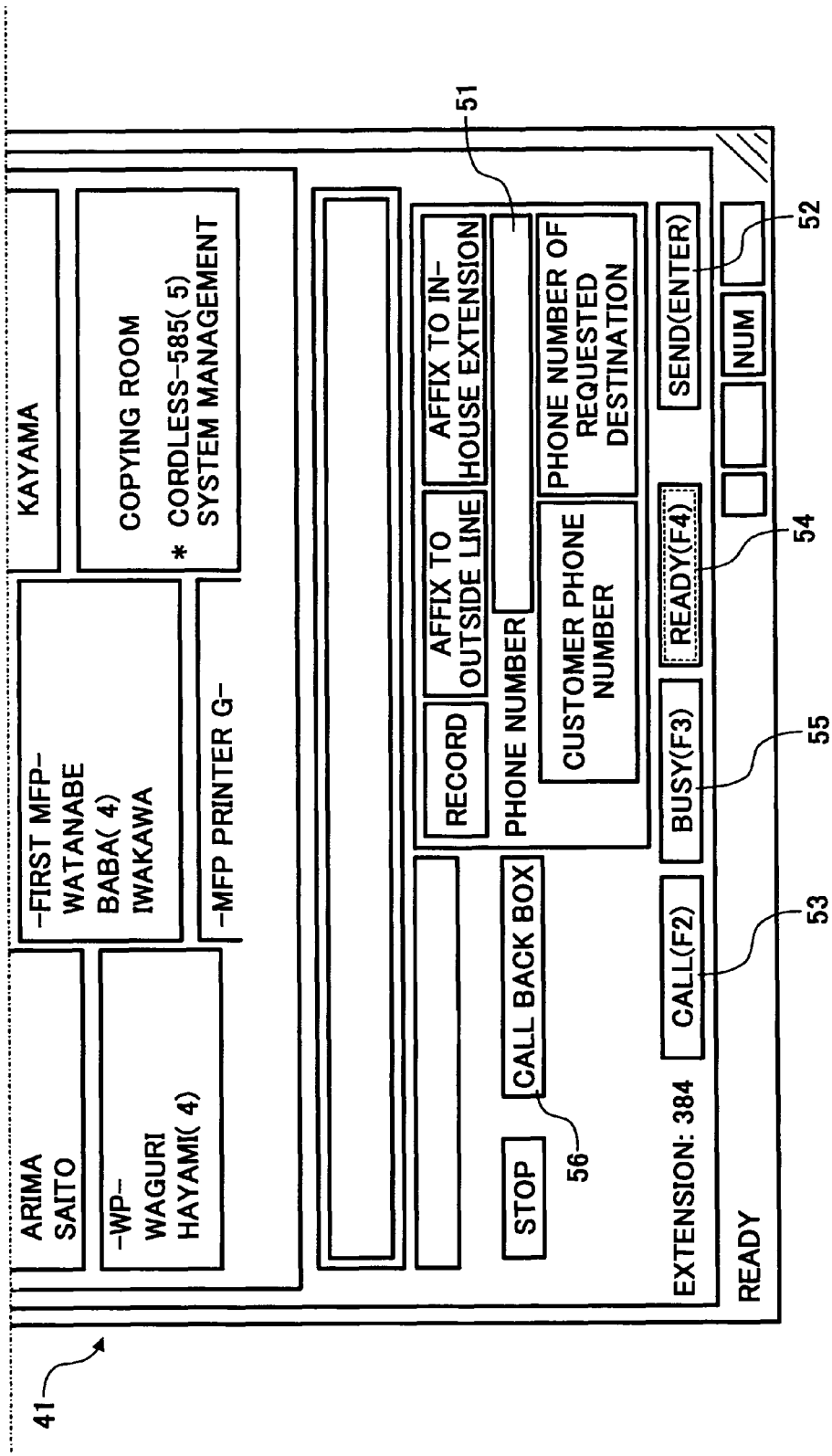
FIG. 5 is a plane view showing the main screen displayed in the client PC.

In STEP S1, for example, when communicator 19 clicks the reference key 42 of the main screen 41 shown in FIG. 5 with a mouse, the control unit interprets that the predetermined operation has been conducted (STEP S1:Y). In STEP S2, for example, when communicator 19 chooses the main screen 41 using a mouse, the control unit changes the display of the display unit's main screen 41 from the situation of inactive to active, and interprets that the main screen 41 has changed (STEP S2:Y). In STEP S3, for example, as aforementioned, when the client respondence information has been sent from the server PC 8, the control unit interprets that the situation of the PBX 5 has changed (STEP S3:Y).

In the main screen 41, which is displayed in STEP S5, each communicator 19's name 44 registered in the communicator management table 31, is displayed according to groups 43. These groups 43, correspond to the group ID 32 of the communicator management table 31 in FIG. 3. For example, it can not be seen in FIG. 5, but when communicator 19's business situation is talking on the phone, the communicator 19's name is displayed in red, when communicator 19's business situation is not at his/her seat (READY situation), it is displayed in black, and when he/she is available, it is displayed in yellow. By this display, the business situation of other communicators 19 is notified to each communicator 19. Each group 43's group name 45, for example, is displayed in blue.

The control unit, at predetermined timing, obtains the registered content of the communicator management table 31, from the server PC 8, and updates the display of the registered content to the newest content. In this example, the predetermined timing is one of the following: when the control unit detects a communicator 19's predetermined operation (STEP S1); when the control unit detects a change of situation in the main screen 41 (STEP S2); or when the control unit detects a change of situation of the PBX 3 corresponding to a concerned client PC 6. However, the timing of when the control unit obtains the registered content of the communicator management table 31 from the server PC 8 and updates it, is not limited to the aforementioned timing, and for example, the control unit can update the registered content at a predetermined period.

Because each communicator 19 can confirm the business situation of other communicators, such as being on the phone or not at his/her seat, in the display unit of the client PC 6, he/she can understand the situation of other communicators at a glance, without the need to forward the call to the concerned communicator. Consequently, each communicator 19 can tell the customer 14, without hanging on the phone. Also, because each communicator 19 can work with watching other communicator's situation on the screen real-time, he/she can know the circumstances of the supporting staff for unexpected calls such as complaints.

In each client PC 6, the main screen 41 shown in FIG. 5, receives operation from the telephone terminal 5 corresponded to the concerned client PC 6. That is, on the main screen 41, a phone number input space 51 is prepared, and in this space, the communicator 19, inputs a phone number (extension number) with a keyboard and so on, and clicks the "ENTER" button 52. The client PC 6's control unit requests the server PC 8 to call the telephone terminal 5 corresponding to the inputted phone number. The server PC 8, answering to this request, through the CTI server 9, makes the PBX 3 send a calling signal to a designated telephone terminal 5, which leads to communication with the requested communicator 19.

Also, when the communicator 19 clicks the "CALL" button 53, the control unit accepts a call to the telephone terminal 5.

Furthermore, when the communicator 19 switches the "READY"/"WORK" button on the main screen 41, the control unit responding to this operation sends the business situation information to the server PC 8, and requests a change in the registered content in the communicator management table 31. The server PC 8, records the business situation information sent from the client PC 6's control unit on the communicator management table 31. When the PBX3 receives a calling signal from the external telephone network 2, and the telephone terminal 5, used by communicator 19 corresponding to caller's phone number accompanying this calling signal, can not receive the call, through the CTI server 9 and according to the ACD 20 referring to the registered content of the communicator management table 31, the telephone terminal 5 of another communicator 19 is called. Here, the communicator 19, when he/she is not at his/her seat, sets the "READY"/"WORK" button 54 to "READY", and when he/she is at his/her seat, sets the "READY"/"WORK" button 54 to "WORK". Also, when he/she is busy and can not get the phone, the "BUSY" button 55 may be clicked to express the busy situation.

Now, processing merits of the CTI system 1, comprising basic functions mentioned above, in the embodiment of this present invention, will be discussed. Here, a case where a call from a customer 14 is not sent to the group of the communicator 19 (corresponding to that customer 14), but sent to the telephone terminal 5 of another communicator, will be thought out. Namely, the processing, in a case where other communicators try to forward the phone calls, but all of the communicator 19's in the corresponding group are on the phone, or not at his/her seat and can not answer the phone, will be described.

In this case, as aforementioned, in the display unit of the client PC 6, which corresponds to communicators taking that call, the communicator 19's name, who is designated to take that call, is displayed in red, to show that his/her business situation is, taking a different call, or is displayed in black, to show that his/her business situation is, not at his/her seat (READY situation). Therefore, other communicators taking a call from a customer 14, can tell the customer 14 without forwarding the phone, that the designated communicator can not get the phone at the moment, but the concerned communicator will be told to call them back as soon as possible.

Figure 6:
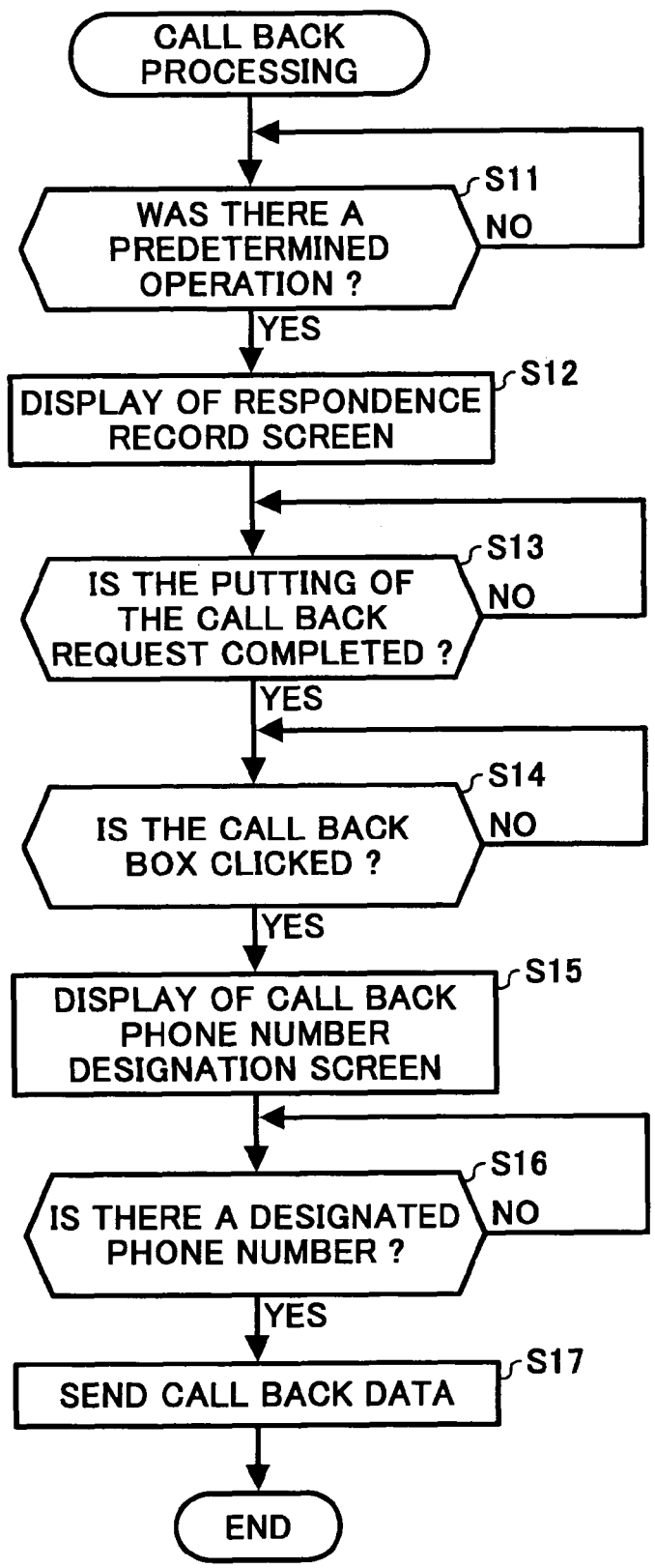
FIG. 6 is a flow chart showing the call back process.

Next, according to the operation of other communicators besides the concerned communicator, the client PC 6 carries out a call back processing shown in FIG. 6.

Figure 7B:
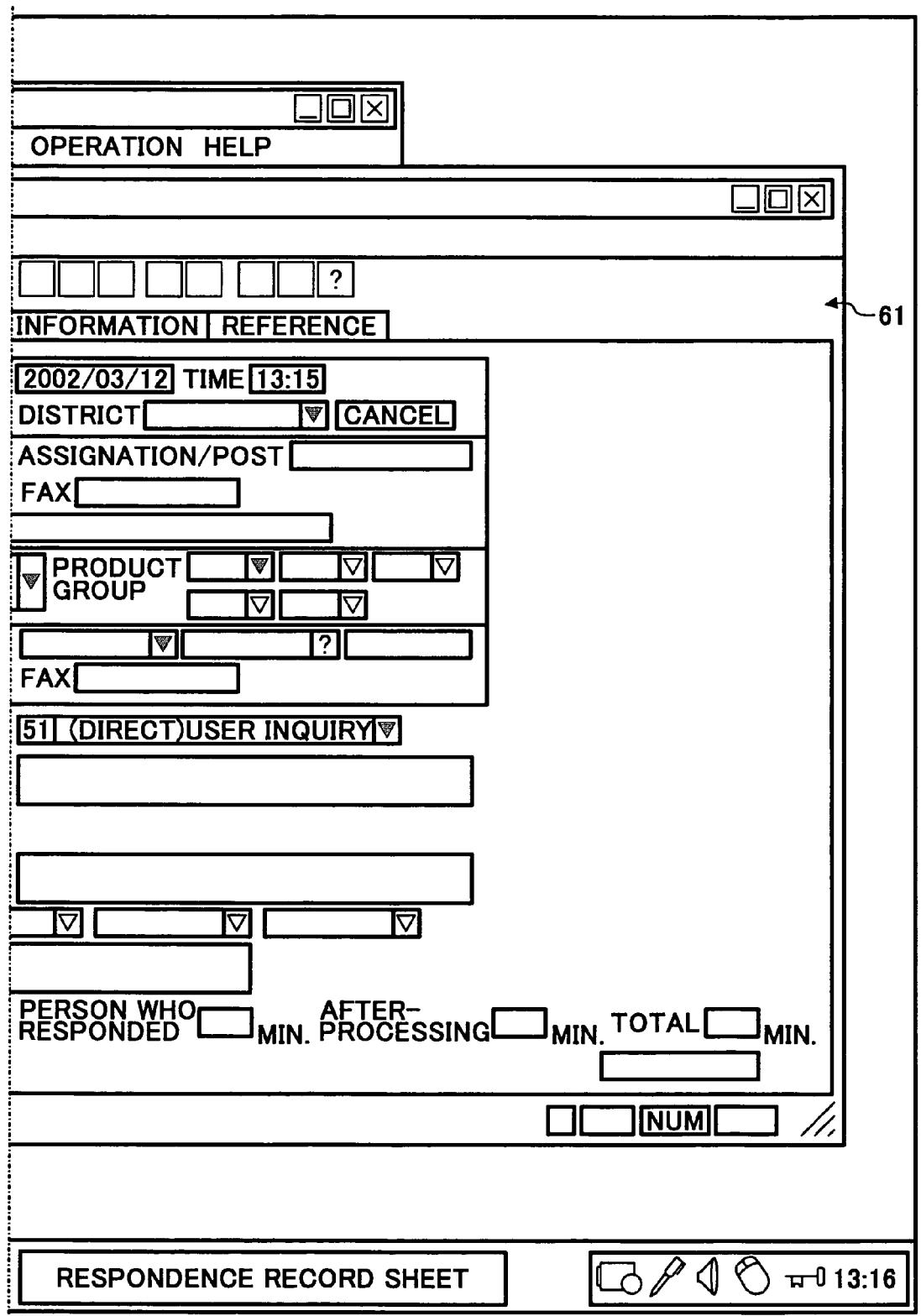
FIG. 7 is a plane view showing the respondence record screen displayed in the client PC.

When other communicators 19, take a call from a customer 14, and does the predetermined operation, (for example, double clicks a predetermined icon, which is not illustrated in the drawing), the client PC's control unit detects this operation (STEP S11:Y), and displays a respondence record screen 61 in the display unit (STEP S12). As shown in FIG. 7, in the respondence record screen 61, a name of a customer 14, and a content of the phone call, is able to be inputted.

Figure 8A:
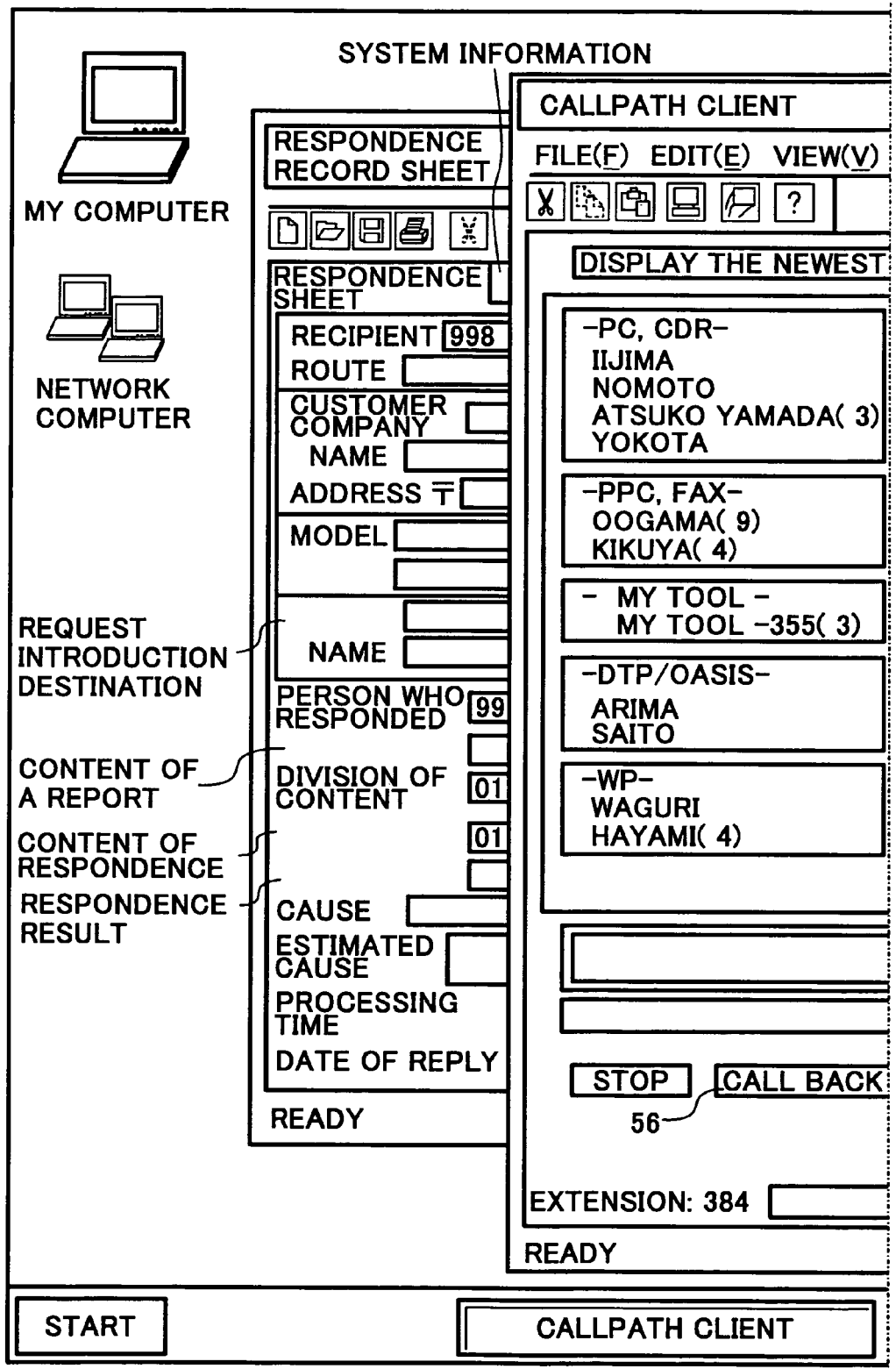
FIG. 8 is a plane view showing the main screen changed from an inactive state to an active state, displayed in the client PC.
Figure 8B:
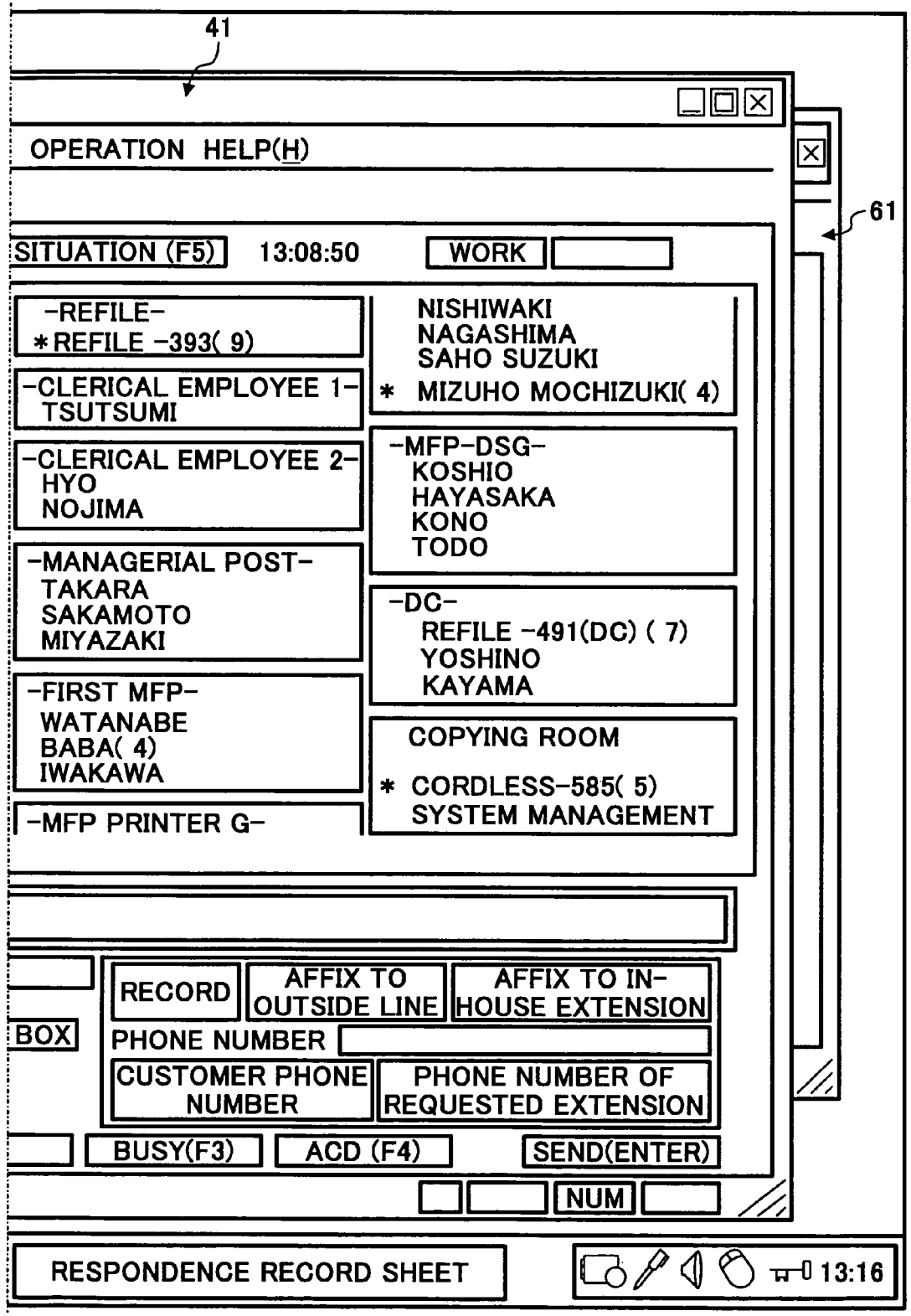

After communicator 19 inputs a call back information in the respondence record screen 61, for example, he/she chooses the main screen 41 with a mouse. The control unit, responding to this operation, interprets that the call back information has been inputted (STEP S13:Y), and stores the inputted call back data in RAM. Then, the control unit, as shown in FIG. 8, changes the main screen 41's window from inactive to active, and displays a call back BOX button 56, included in the main screen 41 in an active state, in the display unit.

Figure 9A:
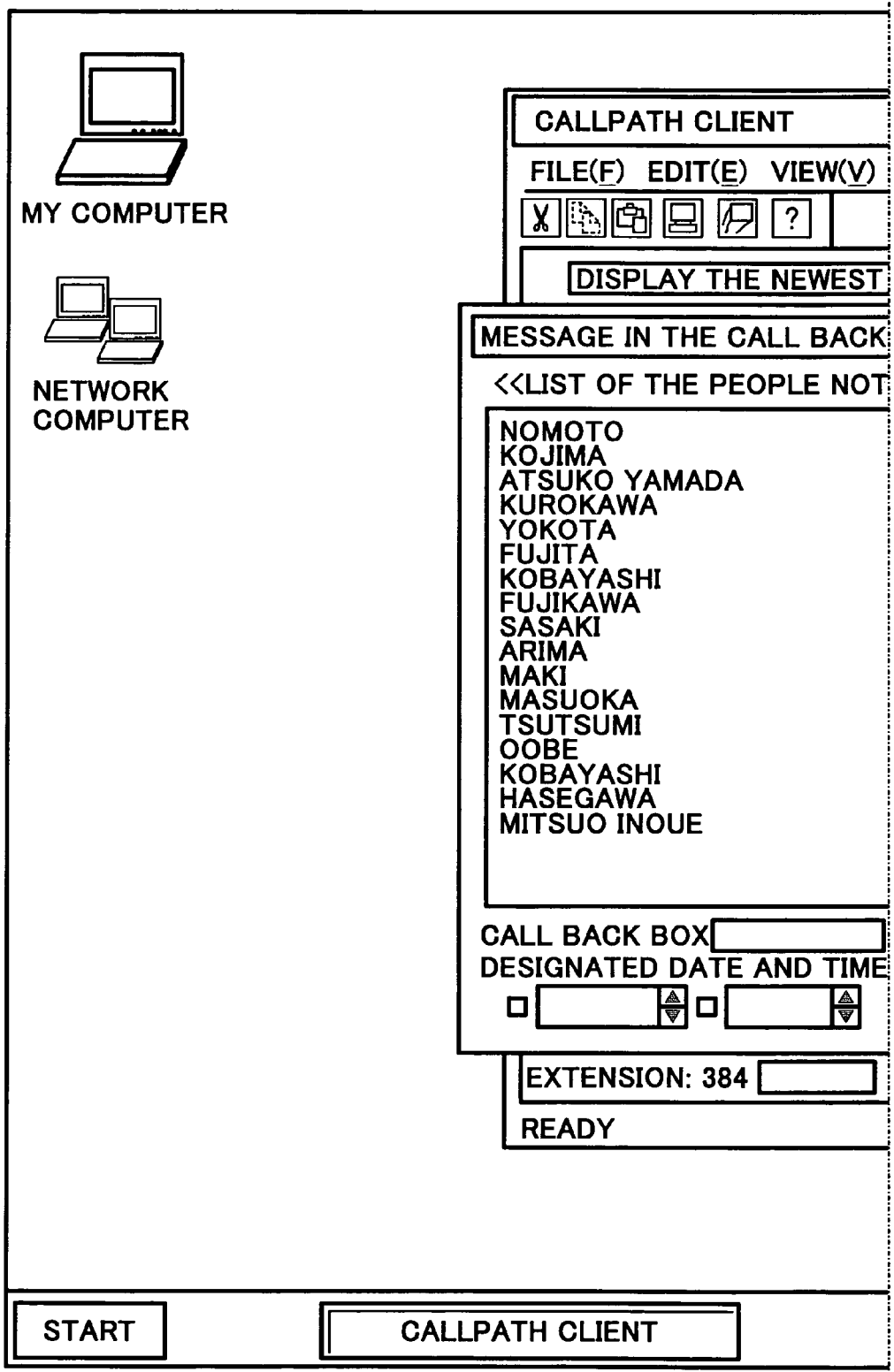
FIG. 9 is a plane view showing the call back destination designating screen displayed in the client PC.
Figure 9B:
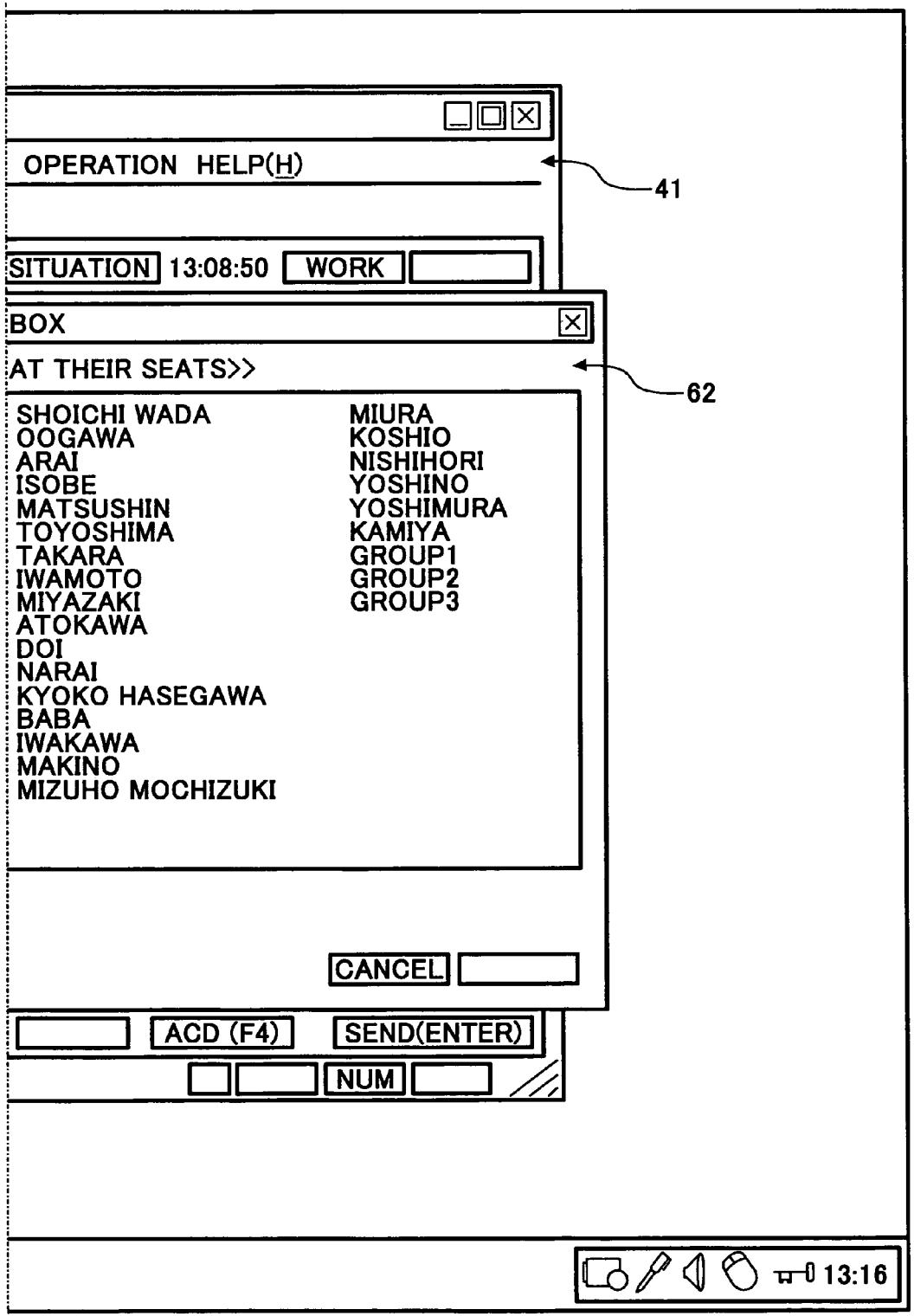

When the communicator 19 clicks the call back BOX 56, for example with a mouse, the control unit detects this operation (STEP S14:Y), and displays a call back destination designating screen 62, shown in FIG. 9, in the display unit.

Figure 10A:
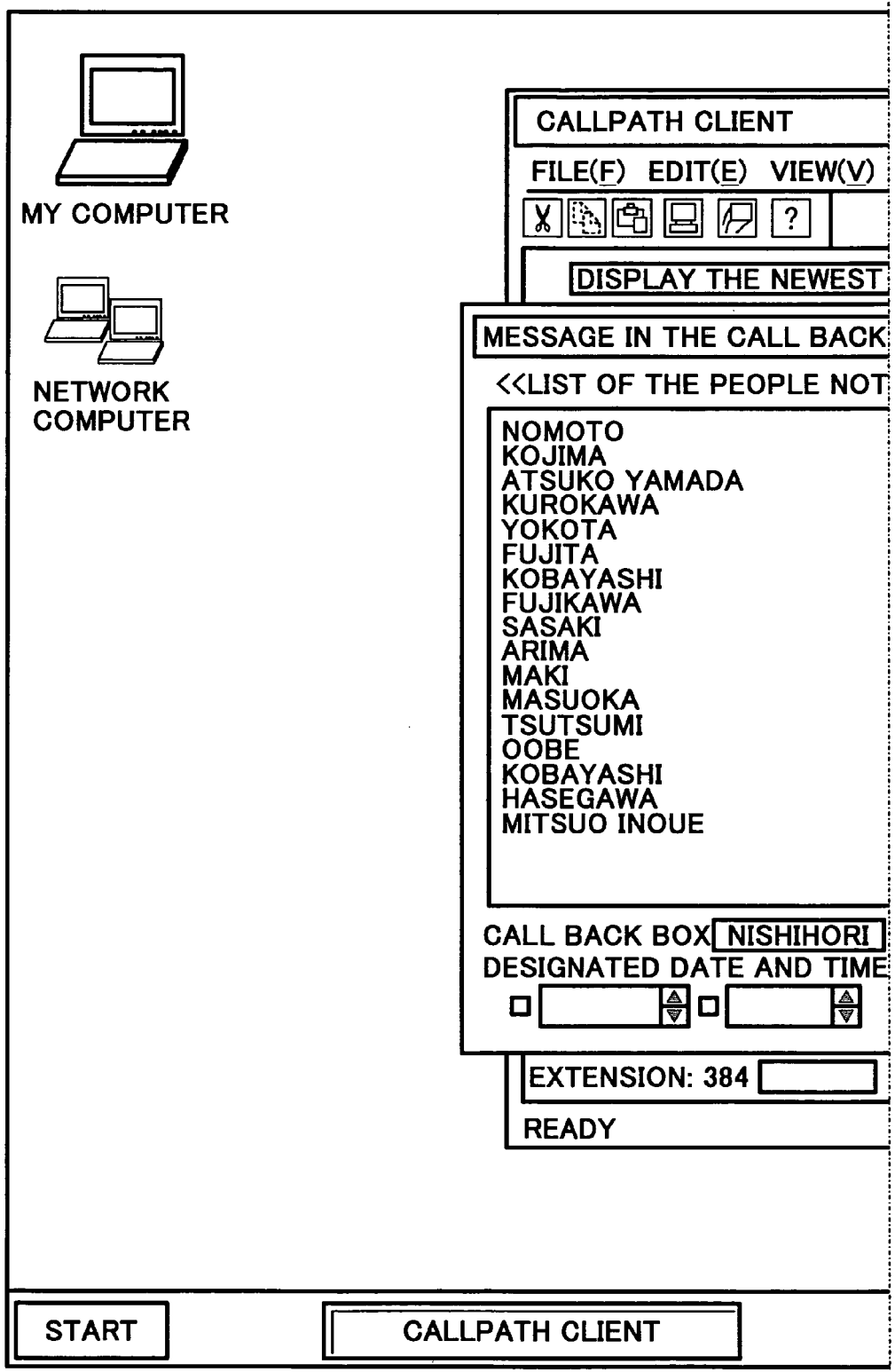
FIG. 10 is a plane view showing the call back destination designating screen when a call back destination is designated.
Figure 10B:
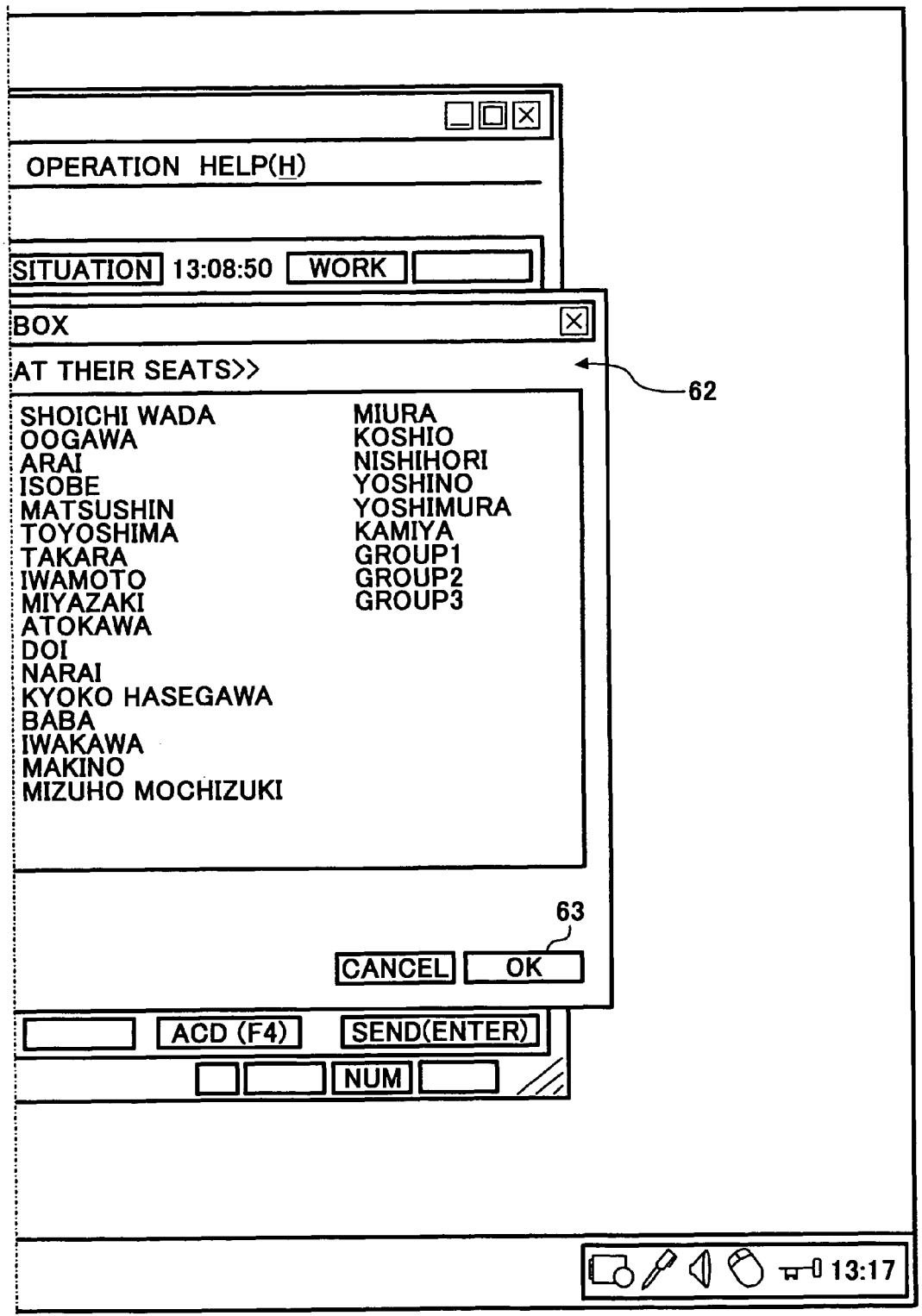

On this call back destination designating screen 62, as shown in FIG. 10, communicator 19, for example, after inputting the phone number (extension number) of a communicator (individual or group) who needs to call back a customer, with a keyboard, clicks the "OK" button 63 with a mouse. Here, the phone numbers correspond to a telephone terminal identification ID of the communicator management table, and besides shown in FIG. 3, in the aforementioned table 31, an address number, in the network 7 of the client PC 6 corresponding to each communicator, corresponds to a telephone terminal identification ID and is recorded. The client PC 6's control unit, responding to this operation, (STEP S16:Y), refers to the communicator management table 31 of the server PC 8, and searches for the client PC's address number corresponding to the inputted telephone number. Furthermore, the client PC 6's control unit extracts the call back data recorded in RAM before, and sends the call back data to the found address number (STEP S17). The designation of a call back communicator, or communicators, can be an individual, or a group of requested communicators 19. By this, every communicator 19 belonging to the group, can look at the call back data, and anyone can respond to a call, leading to a swift respondence.

Figure 11:
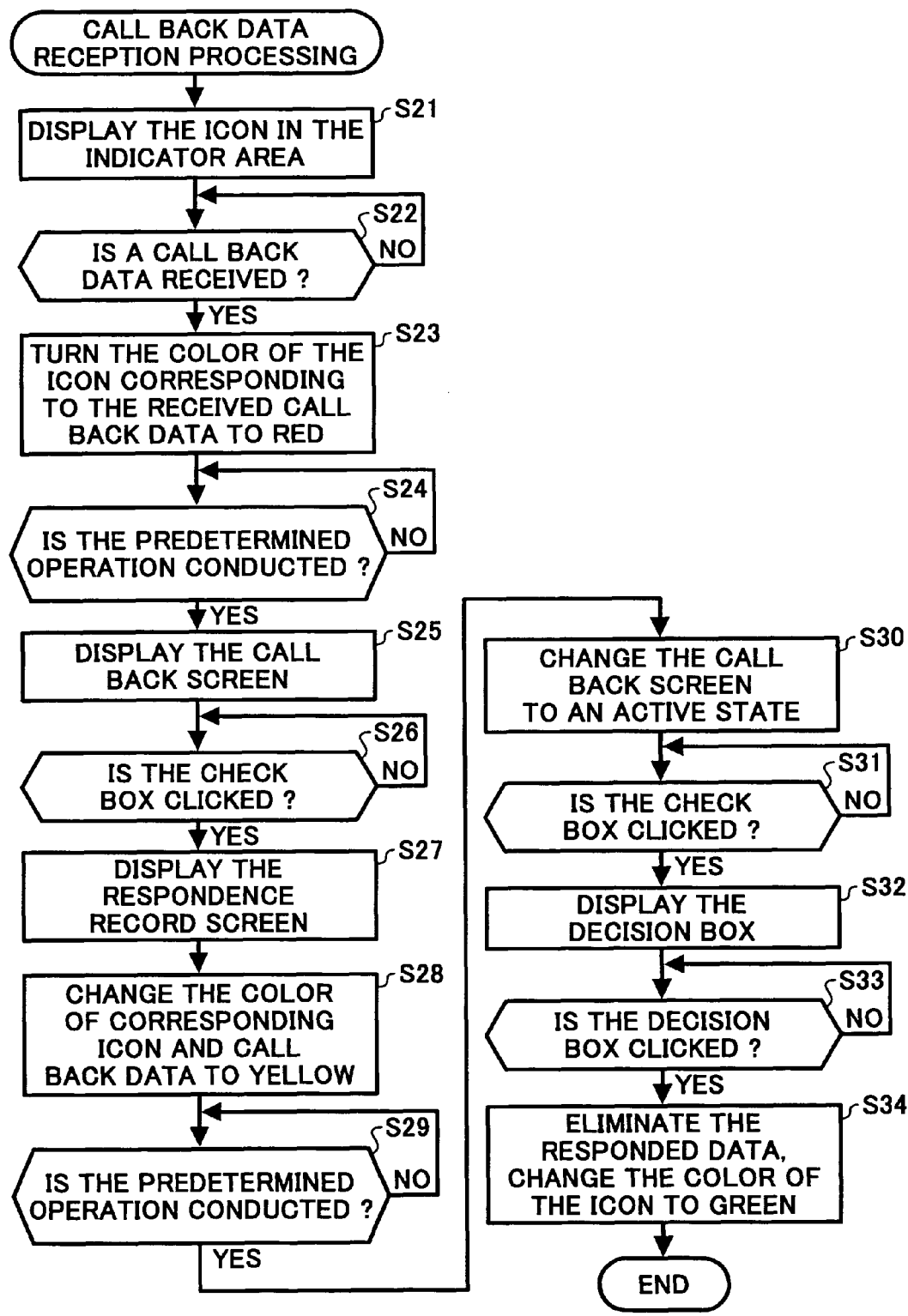
FIG. 11 is a flow chart showing the receiving process of the call back data.

Next, a call back data receiving process, executed when client PC 6 receives call back data, will be described. FIG. 11, is a flow chart showing the call back data receiving process. Here, a program to receive call back data from other client PCs 6, is run beforehand.

Due to running this program for receiving call back data, is started, the client PC 6's control unit displays two kinds of icons 65 and 66 (STEP S21) in an indicator area 64 of the display unit, as shown in FIG. 12. Here, the icon 65, displayed as "P", indicates whether there is (are) call back data sent to an individual (personal), and the icon 66, displayed as "G", indicates whether there is (are) call back data sent to a group. It is not shown in FIG. 12, but, when icon 65 and icon 66 are in a waiting state to receive call back data, each of them are displayed, for example in green.

In this situation, when the client PC 6's control unit detects that it has received call back data for an individual, or for a group (Y of STEP S22), it changes the color of either icon 65 or icon 66, corresponding to the received call back data (STEP S23). Here, a call back data reception notifying means is embodied. When a call back data is received, icon 65 and 66 are displayed in red, respectively, and communicator 19 is notified that he/she has received call back data.

Figure 13B:
FIG. 13 is a plane view showing the call back screen displayed in the client PC.
Figures 13A, 13B:
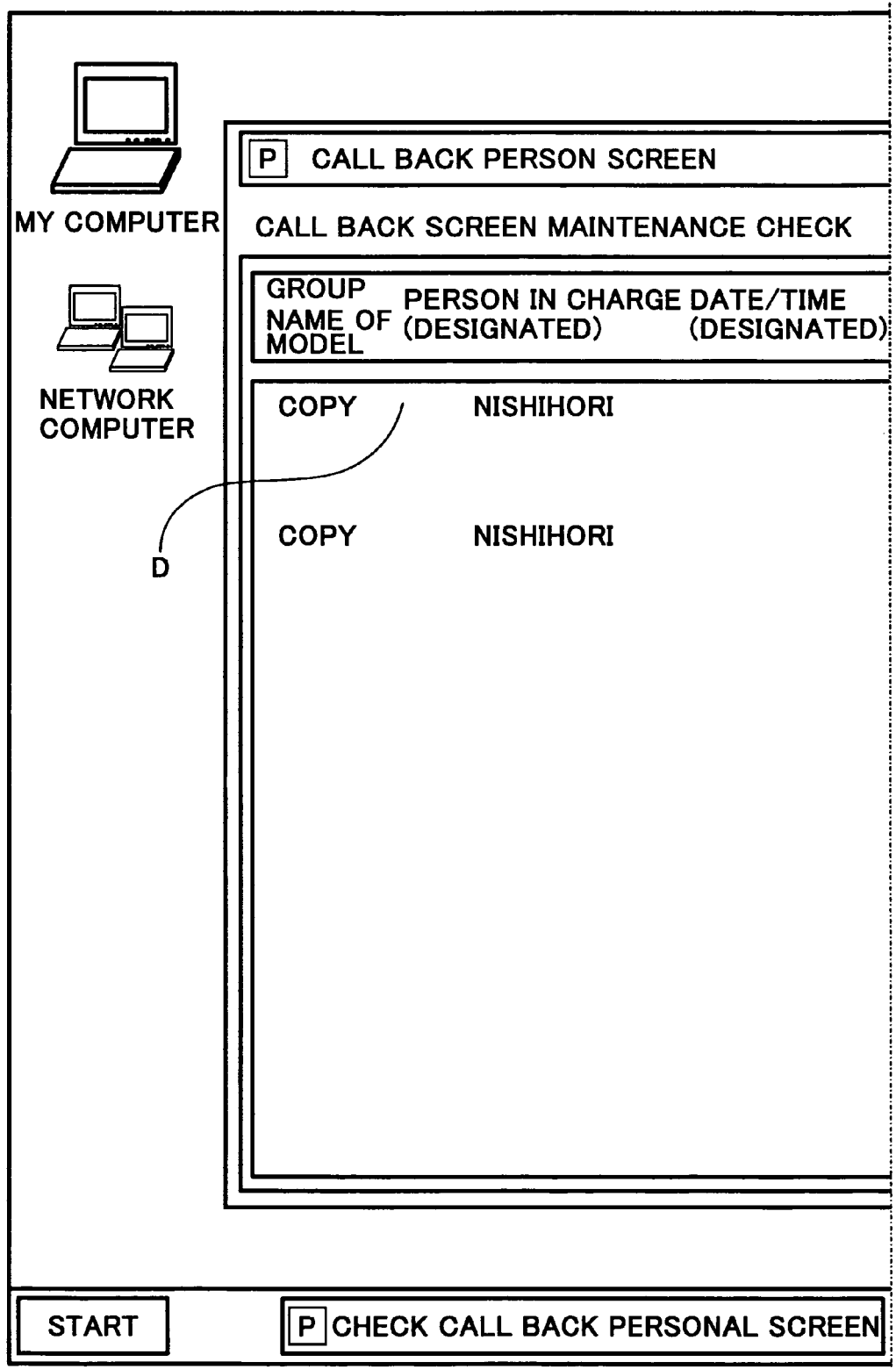

When communicator 19 recognizes that the color of either icon 65 or 66 has changed from green to red, and conducts a predetermined operation, (for example, double clicks the icon which has changed from green to red), the control unit of client PC 6 detects this operation (STEP S 24:Y), and displays a call back screen 67 shown in FIG. 13, in the display unit (STEP S25).

In this way, the control unit of client PC 6 notifies the communicator 19 immediately, that it has received call back data. By this, problems such as a communicator being late in calling back to a customer, or not calling back at all, due to a communicator not noticing that he/she has received call back data, or a delay in instructing the display of a call back data to be shown, can be avoided.

FIG. 13 illustrates a personally directed call back screen, displayed when icon 65, indicating "P", which shows whether there is personal call back data or not, is double clicked. As shown in FIG. 13, call back data D, which requires call back processing, is listed in the inputted order, and each call back data D has a check box C, in the call back screen 67. Because the received call back data is listed, a problem of communicator 19 forgetting to respond to that call, can be avoided. Also, because the data is listed according to the inputted order, a problem of making a mistake in the priority of who to call back first, can be avoided.

Figure 14A:
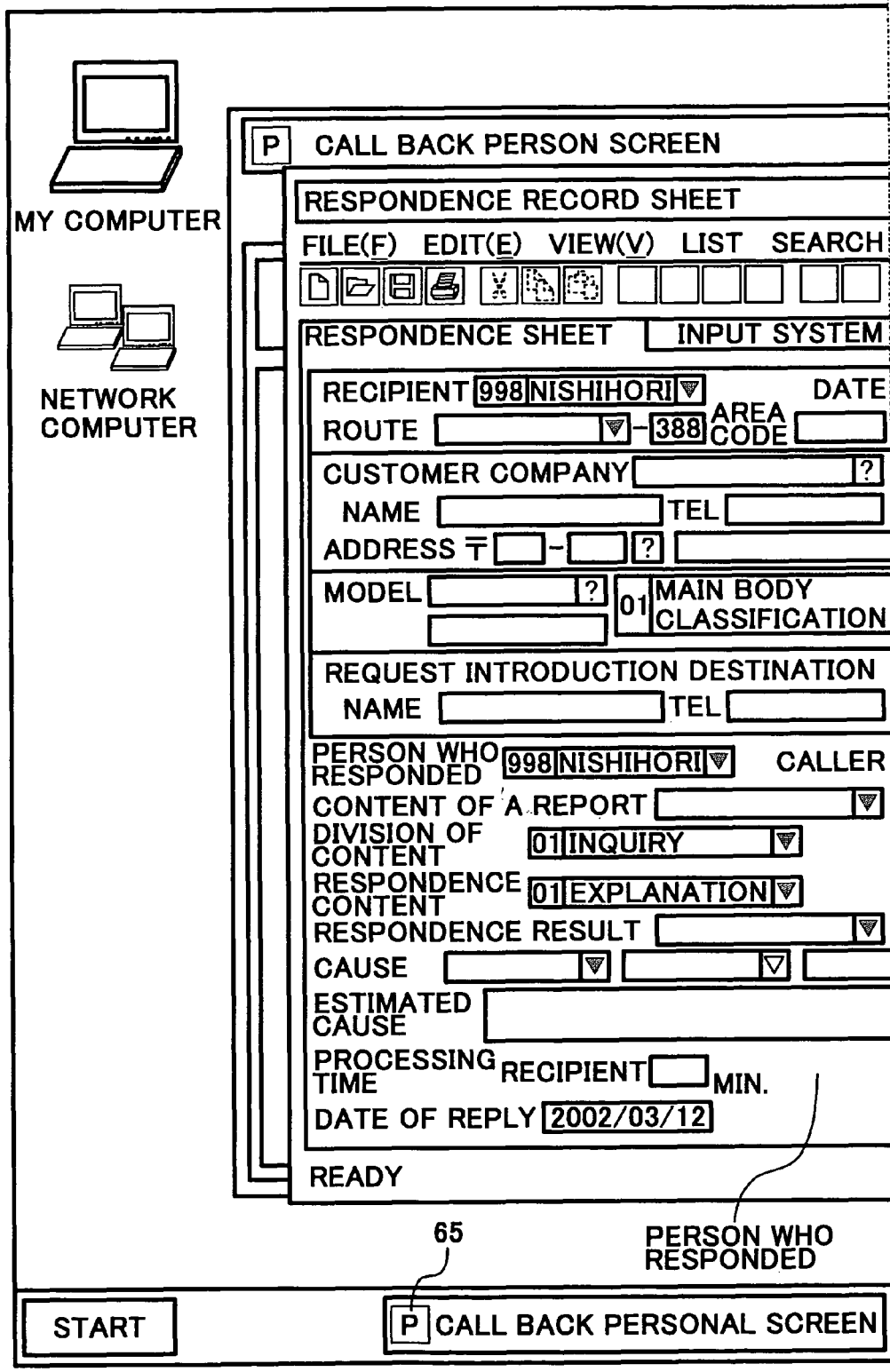
FIG. 14 is a plane view showing the respondence record screen, which the predetermined items are inputted, displayed in the client PC.
Figure 14B:
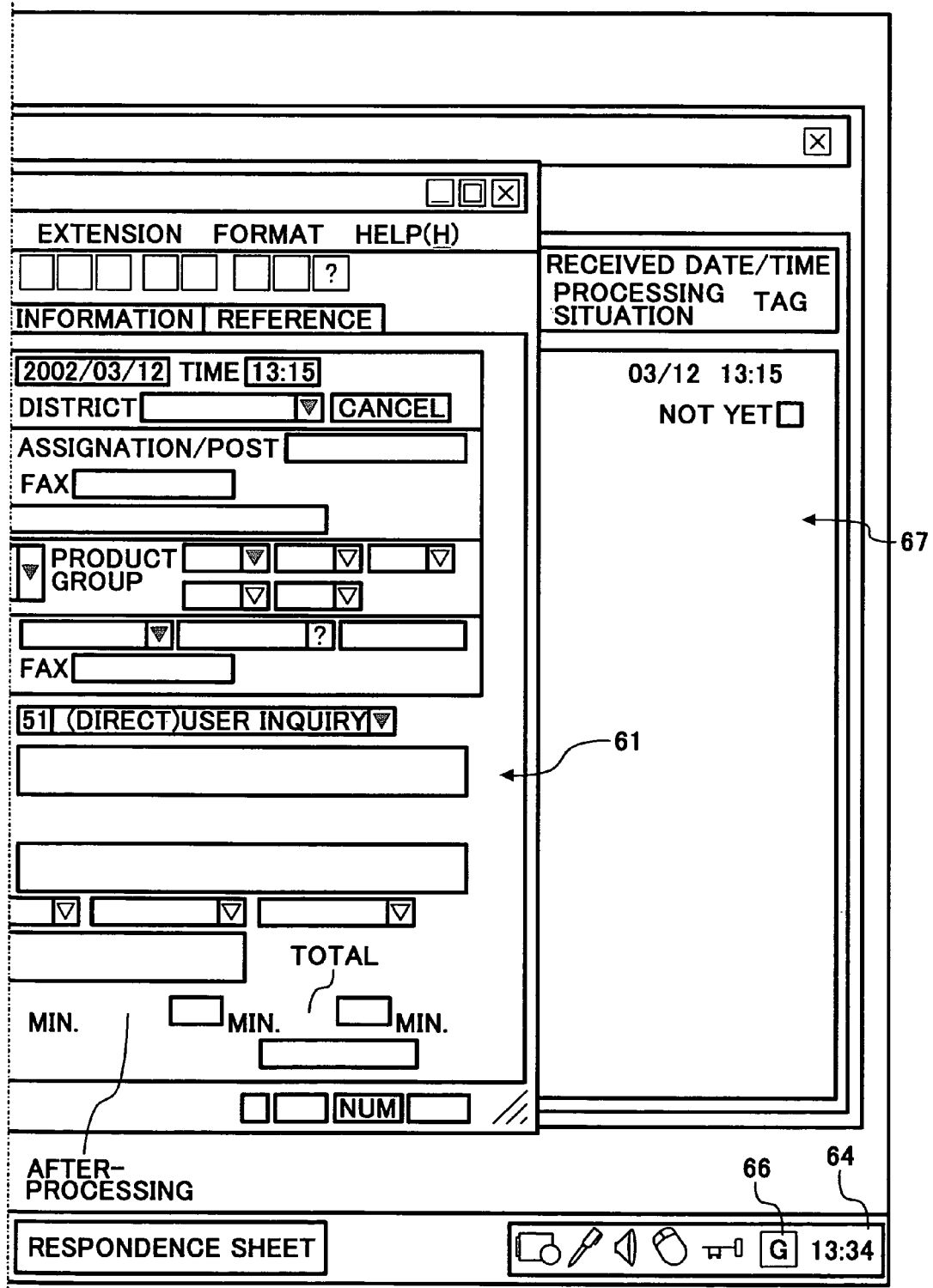

Communicator 19, clicks the check box C of the confirmed call back data D in the call back screen 67. When the control unit of client PC 6 determines that the check box C of the confirmed call back data D, in call back screen 67, is clicked (checked) (STEP S 26:Y), the display unit displays the respondence record screen 61 in an active situation, as shown in FIG. 14 (STEP S 27). At this time, the call back screen 67 changes to an inactive situation. Here, when the respondence record screen 61 is displayed, icon 65 or icon 66 is displayed in yellow, and each call back data D of the call back data screen 67, is also displayed in yellow. Also, when another communicator 19 displays the call back screen 67, each data of the call back data D in the call back screen 67, is displayed in yellow. By this, other communicators 19 are notified that the call back data is being responded to. Here, a respondence notifying means is embodied. By this, a problem of plural communicators 19 duplicating to respond is avoided.

In this way, in a state where the correspondence record screen 61 is displayed, communicator 19 calls back the customer 14 listed in the respondence record screen 61.

Figure 15A:
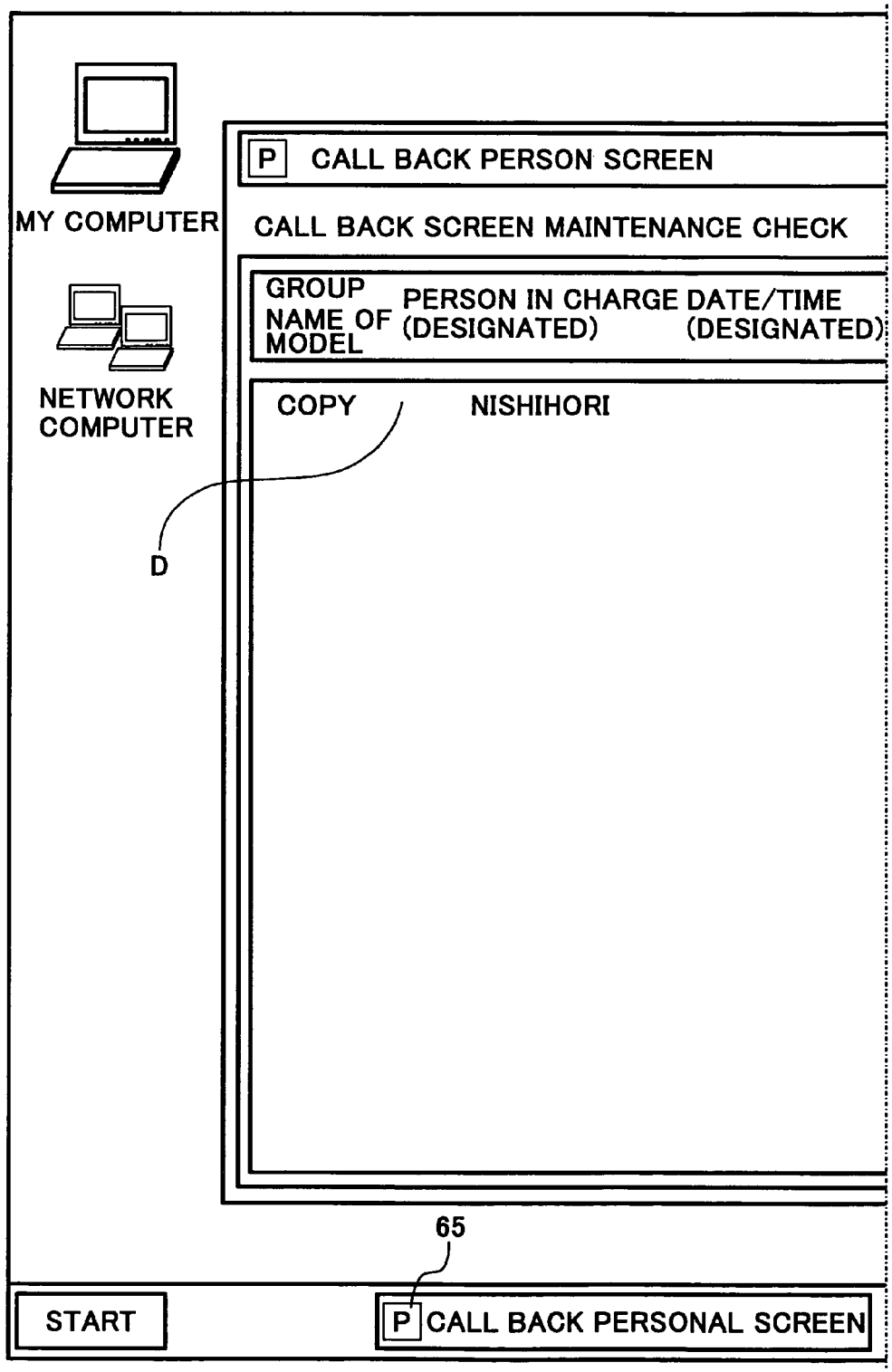
FIG. 15 is a plane view showing the decision box displayed in the client PC.
Figure 15B:
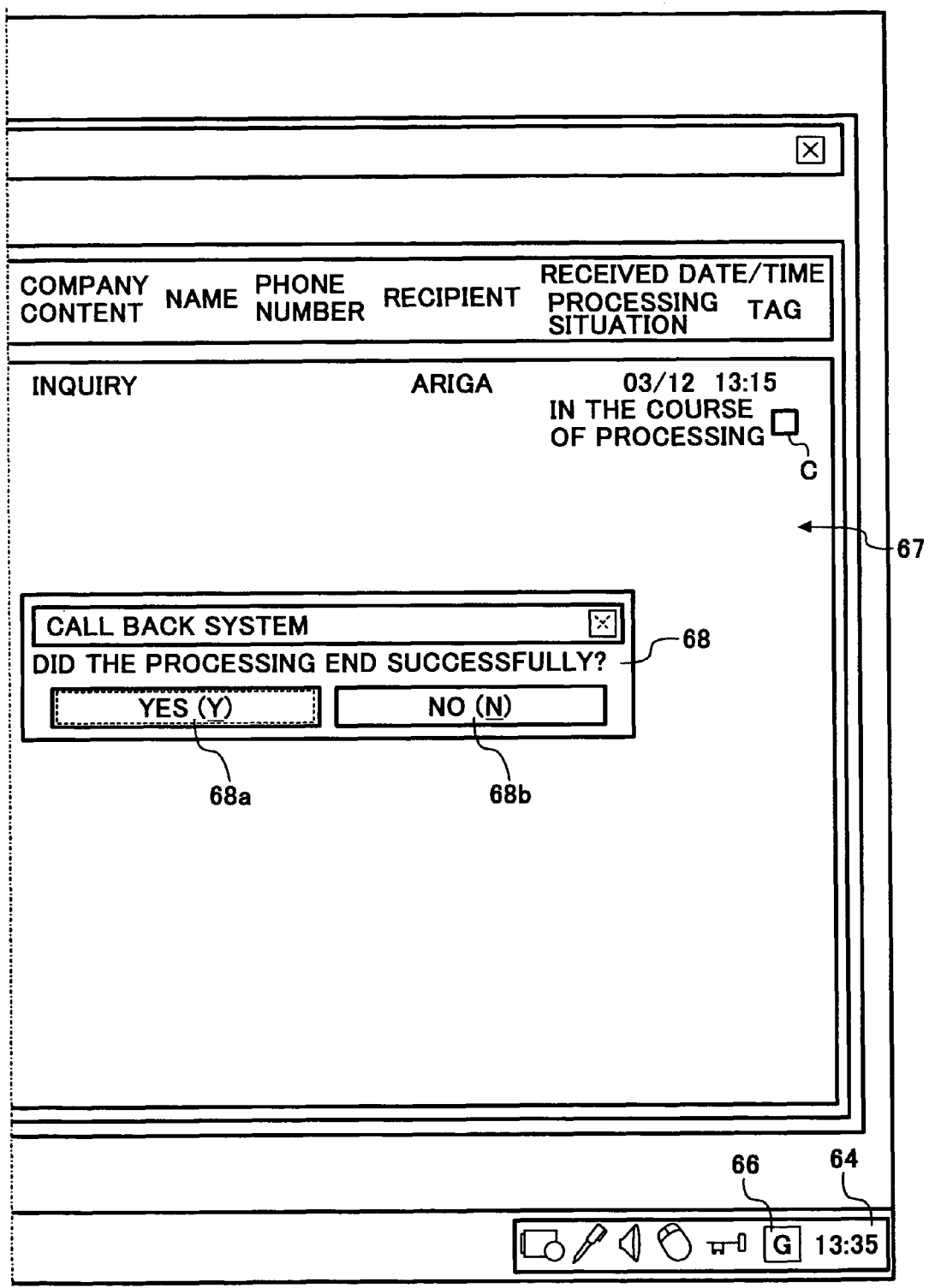

After that, when the communicator 19, who has finished responding to a call back, conducts a predetermined operation (for example, clicks the call back screen 67), the control unit of the client PC 6 detects this operation (STEP 29:Y), and makes the call back screen 67 active (STEP S 30). Then, communicator 19 clicks (checks) the check box C of the responded call back data D, which is displayed in yellow, in the call back screen 67. When the control unit of the client PC 6, when it interprets that the check box C of the concerned call back data has been clicked (checked) (STEP S31:Y), as shown in FIG. 15, it displays a determination box 68 in the display unit, to input whether a processing of a call back has been successfully conducted or not (STEP S32). The Communicator 19 clicks "YES" 68 *a*, when the processing was conducted successfully, and "NO" 68 *b*, when the processing was not conducted successfully.

Figures 16A, 16B:
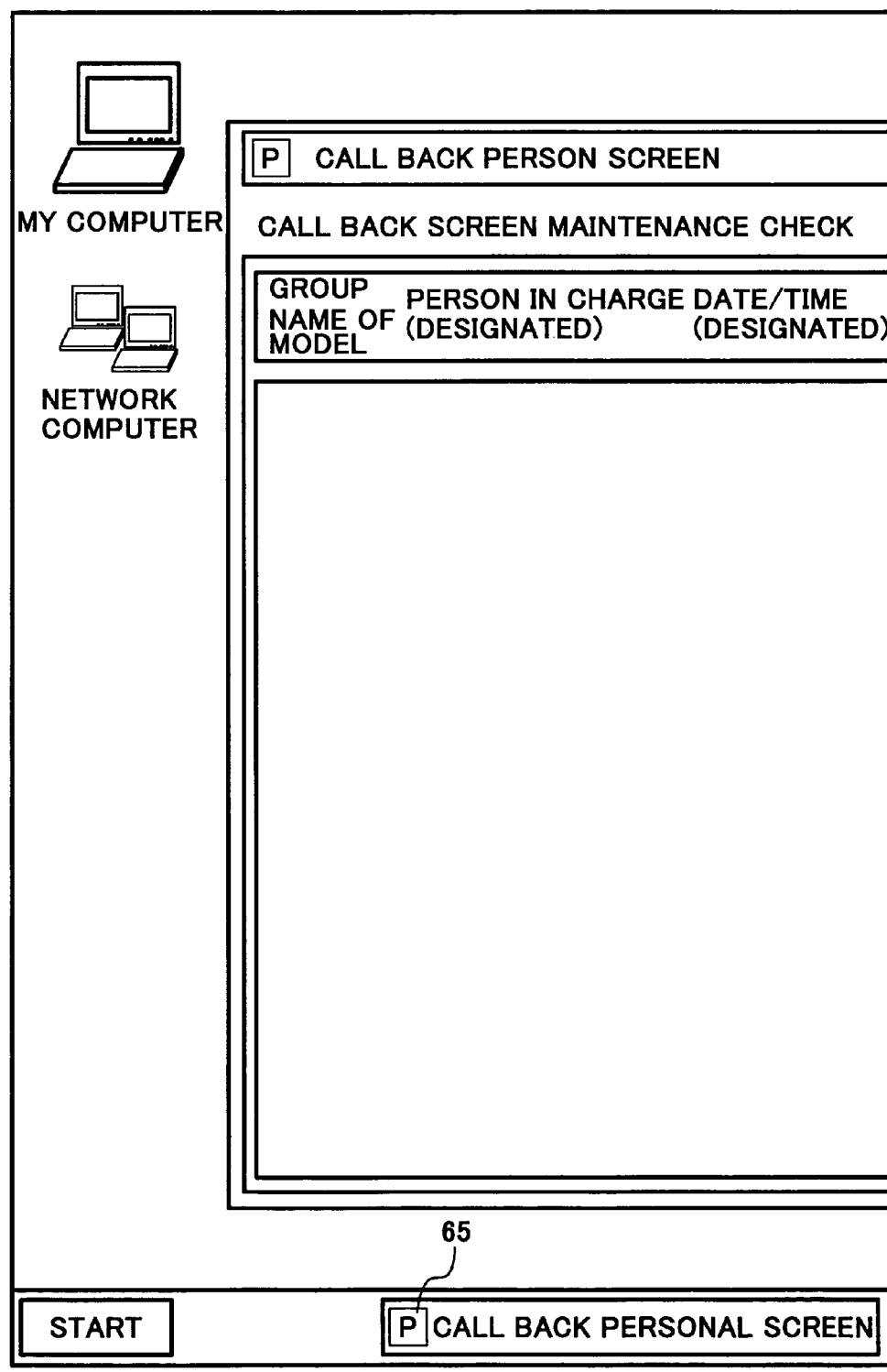
FIG. 16 is a plane view showing the call back screen after a processing, displayed in the client PC.
Figure 16B:
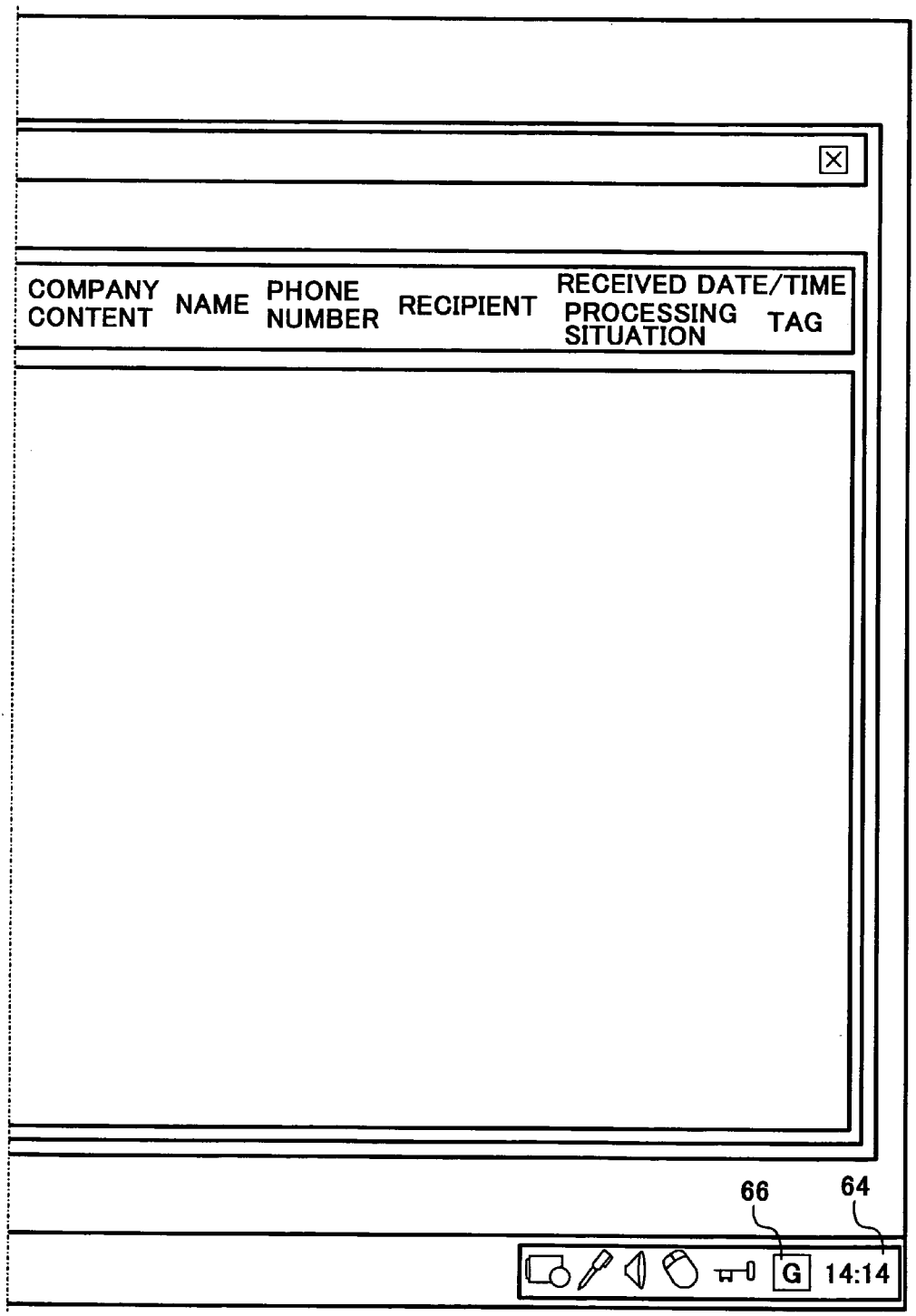

When the control unit of client the PC 6, determines that either "YES" 68*a*, or "NO" 68*b*, of the determination box 68 has been clicked as shown in FIG. 16, it eliminates the responded call back data D displayed in yellow, in the call back screen 67 (STEP S34), and the control unit changes the color of icon 65 (icon 66) from yellow to green (STEP S34).

As described in above, according to the customer responding system of this present invention, when the telephone terminal, used by not the requested communicator 19 but other communicators 19, receives a call from a customer 14, and the other communicator 19 can not forward the call from the customer 14 to the requested communicator 19, these other communicators 19 can notify the requested communicator 19 of the call back content. Concretely, communicator 19, who takes a call, inputs the call back data indicating the content of a call back which should be notified to the requested communicator 19, in the displayed respondence record screen 61 of his/her client PC 6. The inputted call back data is sent to the client PC 6 used by the specifically requested communicator 19. Whereas, when the client PC 6, used by the requested communicator 19, receives call back data, the client PC 6, displays the received call back data, responding to the concerned communicator 19's predetermined operation. By this, prior complex movements, such as writing correspondence record sheets, and putting in the written correspondence sheets in a predetermined place, are not necessary, to rapidly notify the requested communicator 19 of a call back content.

The present invention is not limited to the aforementioned embodiment, and practical application and modification are arbitrarily made. For example, according to the aforementioned embodiment, it is described that the client PC 6, based on the inputted phone number, searches the communicator management table 31 of the server PC 8, and sends the call back data to the client PC 6, used by the requested communicator, to the client PC 6's address number recorded in this table. However, the method of sending and receiving data between the client PCs 6, is not limited to the aforementioned method, and is arbitrary. For example, it could be that the client PC 6 once sends the inputted phone number and call back data to server PC 8, and the server PC 8, according to the received phone number, searches the aforementioned communicator management table 31, and forwards the call back data to the corresponding client PC 6. Or, it could be that in the client PC 6 of the sender, without inputting the phone number of the telephone terminal 5 used by the requested communicator 19, the sender designates the client PC 6 of the receiver in the network 7, and sends the call back data directly.

In the aforementioned embodiment, it was described that the CTI system 1 comprises a server PC 8, a CTI server 9, and a database server 10. However, the structure of these servers are arbitrary, and are not limited to the aforementioned structure. For example, a CTI server can comprise, a server PC 8, which is a network server, and a CTI server 9, which connects a PBX 3, and a network 7.

In the aforementioned embodiment, the CTI system 1 was described as an example, but the customer correspondence system of the present invention, is not limited to this example. For example, a computer terminal as an information inputting device, can be applied in an ordinary computer usage environment, connected by a predetermined network. The network used here, is not limited to the LAN described in the aforementioned embodiment, and for example, can comprise arbitrary networks, such as WAN (Wide Area Network), and VPN (Virtual Private Network).

In the aforementioned embodiment, it was described that the program for the client PC 6 to carry out various processing, used in ROM, internal storage or external storage, is recorded in various recording mediums. However, the medium that provides the aforementioned program to the client PC 6, is not limited to ROM or the aforementioned recording mediums. For example, the aforementioned program could be sent to a carrier, which computer operation is possible, as a signal, and this carrier can be provided to the client PC 6 to carry out various processing.

As described above, according to the present invention, customer responding system, computer terminal, customer responding means, and recording medium to notify the content of a call back rapidly to the requested communicator, can be provided.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-198676 filed on Jul. 8, 2002, and including specification, claims, drawings and summary. The disclosure of the above Japanese Patent Application is incorporated herein by reference in its entirety.

What is claimed is:

1. A customer responding system, including a PBX (Private Branch eXchange) connected to an external telephone network, which selectively connects a calling signal from the external telephone network to one internal line in an internal telephone network, plural telephone terminals connected to the internal telephone network, and plural computer terminals connected to each other through a predetermined network, which is placed, individually corresponding to the telephone terminal, the system comprising:

a call back message input configured to accept the inputting of a call back message with designating the computer terminal corresponding to the requested telephone terminal, when the PBX can not get the requested telephone terminal amongst the plural telephone terminals, to receive a calling signal from the external telephone network;

a call back data sender configured to send a call back data, which is classified in predetermined items to indicate the content of a received call to be notified, based on the call back message accepted by the call back message input, to the designated computer terminal through the network;

a call back data receiver configured to receive the call back data sent by the data sender; and a call back data display configured to display the received call back data in the designated computer terminal and, in response to designation of the displayed call back data from the computer terminal, identifiably displaying that the designated call back data is being responded to.

2. The system according to claim 1, wherein:

the call back data sender sends the call back data to each designated computer terminal; and the call back data sent by the call back data sender is displayed at each designated computer terminal by the call back data display.

3. A computer terminal, which is used as an information input/output device within the customer correspondence system, including a PBX connected to an external telephone network, which selectively connects a calling signal from the external telephone network to one internal line in an internal telephone network, plural telephone terminals connected to the internal telephone network, and plural information input/output devices connected to each other through a predetermined network, which is placed, individually corresponding to the telephone terminal, wherein:

when the PBX can not get the requested telephone terminal amongst the plural telephone terminals, to receive a calling signal from the external telephone network, the PBX controls a different telephone terminal to receive the calling signal; and the computer terminal corresponding to the concerned different telephone terminal comprises, a call back message input configured to accept the inputting of a call back message, after designating the computer terminal corresponding to the requested telephone terminal;

a call back data sender configured to send a call back data, which is classified in predetermined items to indicate the content of a received call to be notified, based on the call back data, accepted by the call back message input, to the designated computer terminal through the network, a call back data receiver configured to receive the call back data sent from another computer terminal through the network, and a call back data display configured to display the call back data received by the call back data receiver and, in response to designation of the displayed call back data from the computer terminal, identifiably displaying that the designated call back data is being responded to.

4. The computer terminal according to claim 3, wherein:

a server is connected to the PBX through a network;

the computer terminal sends a business situation information of a communicator corresponding to the server;

whether or not the requested telephone terminal can receive the calling signal is determined based on the business situation information sent by the computer terminal; and where it is determined that the requested telephone terminal cannot receive the calling signal, the different telephone terminal is called.

5. The computer terminal according to claim 3, comprising a call back data reception notifier configured to notify a communicator that he/she has received a call back data according to the call back data receiver, and the call back data display, after the call back reception notifier notifies that the communicator has received a call back data, displays the call back data in response to an instruction to display that call back data.

6. The computer terminal according to claim 3, wherein plural computer terminals corresponding to plural communicators responsive to an inquiry of a user are organized into a predetermined group, and the call back data sender sends call back data to each computer terminal included in the group to which the designated computer terminal belongs.

7. The computer terminal according to claim 3, wherein the call back data display respectively lists the content of the received call back data in an order corresponding to the order in which it was input by the call back message data input.

8. A computer terminal comprising:

a call back message data input configured to accept the inputting of a call back message;

a call back data sender configured to send a call back data which is classified in predetermined items to indicate the content of a received call to be notified, based on the call back message inputted by the call back message data input, to the requested computer terminal through a predetermined network;

a call back data receiver configured to receive the call back data sent from another computer terminal through the network; and a call back data display configured to display the call back data received by the call back data receiver and, in response to designation of the displayed call back data from the computer terminal, identifiably displaying that the designated call back data is being responded to.

9. A customer responding method which provides predetermined information to a mutually connected computer terminal based on a received call by the PBX, which is connected to the external telephone network and selectively connects a calling signal from an external telephone network to a telephone terminal connected to an internal line in the internal telephone network, placed corresponding to the telephone terminal individually, through a predetermined network, and the customer responding method comprises:

call back message data inputting step which accepts the inputting of a call back message after a computer terminal corresponding to the requested telephone terminal is designated, when the PBX can not receive the calling signal from the external telephone network to the requested telephone terminal;

call back data sending step which sends a call back data, which is classified in predetermined items to indicate the content of a received call to be notified based on the call back message accepted in the call back message data inputting step, to the designated computer terminal through the network;

call back data receiving step which receives the call back data sent by the data sending step through the network; and call back data displaying step which controls the designated computer terminal to display the received call back data, and, in response to designation of the displayed call back data from the computer terminal, identifiably displaying that the designated call back data is being responded to.

10. A non-transitory computer readable recording medium storing a program for controlling a computer, which is used as an information input/output device in a customer responding system comprising a PBX which is connected to an external telephone network and selectively connects a calling signal from the external telephone network to a telephone terminal connected to an internal line in an internal telephone network, and plural input/output devices which are connected with each other through a predetermined network, the program controlling the computer to function as:

a call back message data input configured to accept the inputting of a call back message with designating the computer terminal corresponding to the requested telephone terminal, when the PBX can not get the requested telephone terminal amongst the plural telephone terminals, to receive a calling signal from the external telephone network;

a call back data sender configured to send a call back data which is classified in predetermined items to indicate the content of a received call to be notified, based on the call back message accepted by the call back message input, to the designated computer terminal through the network;

a call back data receiver configured to receive the call back data sent from other computer terminals through the network; and a call back data display configured to display the call back data received by the call back data receiver and, in response to designation of the displayed call back data from the computer terminal, identifiably displaying that the designated call back data is being responded to.

11. A non-transitory computer readable recording medium storing a program for controlling a computer to function as:

a call back message data input configured to accept the inputting of a call back message;

a call back data sender configured to send a call back data which is classified in predetermined items to indicate the content of a received call to be notified, based on the call back message inputted by the call back data message input, to the requested computer terminal through a predetermined network;

a call back data receiver configured to receive the call back data sent from another computer terminal through the network; and a call back data display configured to display the call back data received by the call back data receiver and, in response to designation of the displayed call back data from the computer terminal, identifiably displaying that the designated call back data is being responded to.

12. A customer responding system, including a PBX (Private Branch eXchange) connected to an external telephone network, which selectively connects a calling signal from the external telephone network to one internal line in an internal telephone network, plural telephone terminals connected to the internal telephone network, and plural computer terminals connected to each other through a predetermined network, which is placed, individually corresponding to the telephone terminal, the system comprising:

a call back message data input configured to accept the inputting of a call back message with designating the computer terminal corresponding to the requested telephone terminal, when the PBX can not get the requested telephone terminal amongst the plural telephone terminals, to receive a calling signal from the external telephone network;

a call back data sender configured to send a call back data, indicating the content of the call back message accepted by the call back message data input, to the designated computer terminal through the network;

a call back data receiver configured to receive the call back data sent by the data sender through the network; and a call back data display configured to display a list of the received call back data so as to be able to select the call back data, to display the selected call back data in the designated computer terminal and, in response to designation of the displayed call back data from the computer terminal, identifiably displaying that the designated call back data is being responded to.

* * * * *